United States Patent
Otaka et al.

(10) Patent No.: US 8,406,734 B2
(45) Date of Patent: Mar. 26, 2013

(54) RESOURCE ACCESS CONTROL FOR MOBILE TERMINAL

(75) Inventors: Osamu Otaka, Tokyo (JP); Mineko Moroto, Tokyo (JP); Norioki Watanabe, Tokyo (JP); Toshihiko Murakami, Tokyo (JP); Satoshi Ogawa, Tokyo (JP); Naomi Nishikata, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 1775 days.

(21) Appl. No.: 10/556,528

(22) PCT Filed: May 14, 2004

(86) PCT No.: PCT/JP2004/006540
§ 371 (c)(1),
(2), (4) Date: Oct. 10, 2006

(87) PCT Pub. No.: WO2004/102394
PCT Pub. Date: Nov. 25, 2004

(65) Prior Publication Data
US 2008/0014912 A1    Jan. 17, 2008

(30) Foreign Application Priority Data

May 15, 2003 (JP) .............................. P2003-137220
May 19, 2003 (JP) .............................. P2003-140722
May 19, 2003 (JP) .............................. P2003-140765

(51) Int. Cl.
*H04M 1/66* (2006.01)
(52) U.S. Cl. ........ 455/410; 455/411; 455/418; 707/783; 707/786; 707/787
(58) Field of Classification Search .................. 455/561, 455/562.1, 101, 103, 410–411, 418; 370/329; 707/783–788
See application file for complete search history.

(56) References Cited

U.S. PATENT DOCUMENTS
(Continued)

FOREIGN PATENT DOCUMENTS

| EP | 1 014 256 A2 | 6/2000 |
|---|---|---|
| JP | 2000-187569 | 7/2000 |
| JP | 2001-75855 | 3/2001 |
| JP | 2002-41363 | 2/2002 |
| JP | 2002-56605 | 2/2002 |
| JP | 2002-182983 | 6/2002 |
| WO | WO 0242918 A1 * | 5/2002 |

OTHER PUBLICATIONS

S. Oaks; "Java Security;"*Kabushiki Kaisha Orairi Japan*; Nov. 28, 2001; pp. 1-17, pp. 69-133 (42 Sheets.).

Primary Examiner — Jinsong Hu
Assistant Examiner — Dung Hong
(74) Attorney, Agent, or Firm — Kratz, Quintos & Hanson, LLP

(57) ABSTRACT

When an application activation instruction is input, it is decided whether the application is expected to access a high-level protection resource or low-level protection resource (step S31). If the decision is affirmative, display is done to prompt the user to select whether to permit activation of the application (step S32). When the user inputs an activation permission instruction, the application is activated (steps S33 to S36). As a result, only when the user permits an application, which is expected to access a high-level protection resource or low-level protection resource, to access a predetermined resource immediately before its execution, the application is executed. Hence, the basic processing part and application can operate in cooperation with each other while limiting access to various kinds of resources by the application in a reasonable range.

8 Claims, 21 Drawing Sheets

U.S. PATENT DOCUMENTS

| | | | |
|---|---|---|---|
| 5,892,904 A * | 4/1999 | Atkinson et al. | 726/22 |
| 6,842,839 B2 * | 1/2005 | Heng et al. | 711/170 |
| 7,149,510 B2 * | 12/2006 | Hansson et al. | 455/418 |
| 7,334,267 B2 * | 2/2008 | Engstrom | 726/27 |
| 2002/0015495 A1 | 2/2002 | Kageyama et al. | |
| 2002/0073072 A1 | 6/2002 | Fukumoto | |
| 2003/0097373 A1 * | 5/2003 | Yamada et al. | 707/104.1 |
| 2003/0143990 A1 * | 7/2003 | Minear et al. | 455/418 |
| 2004/0098715 A1 * | 5/2004 | Aghera et al. | 717/173 |
| 2004/0127190 A1 * | 7/2004 | Hansson et al. | 455/403 |

* cited by examiner

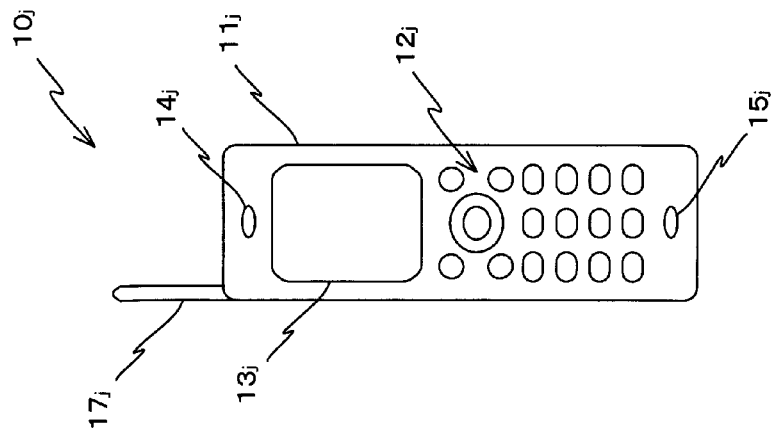

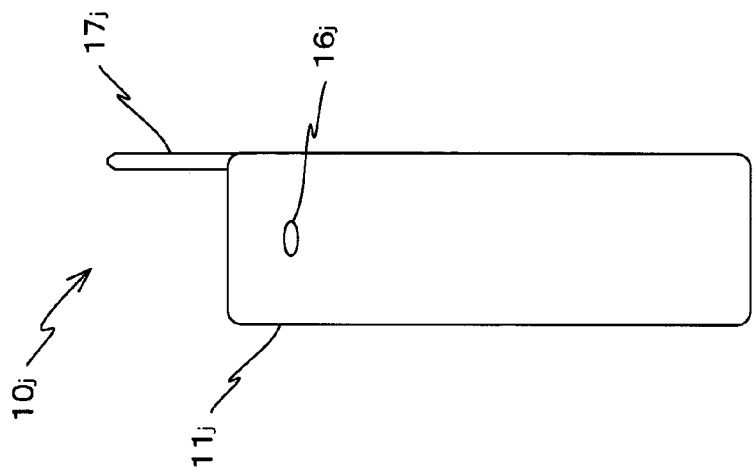

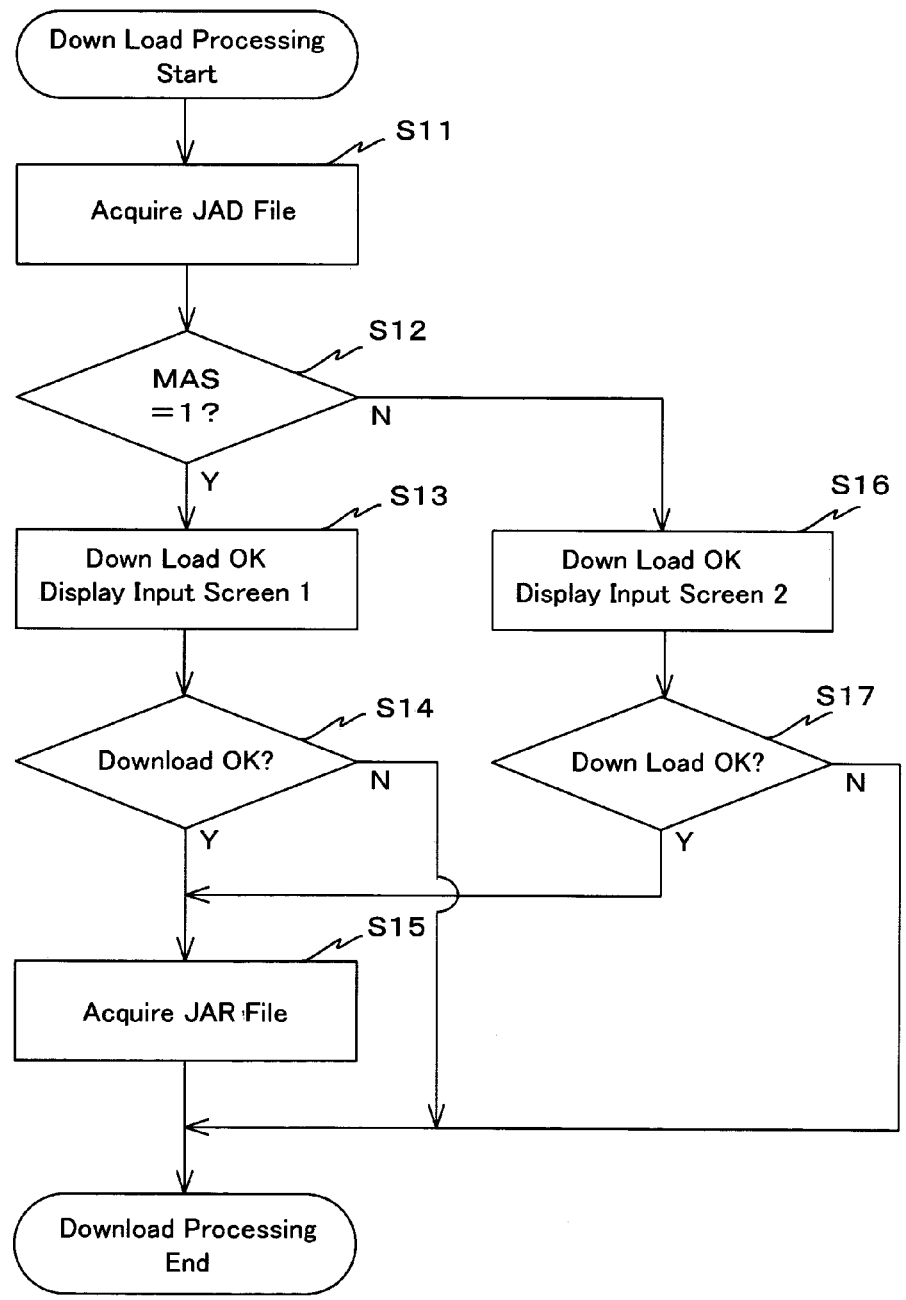

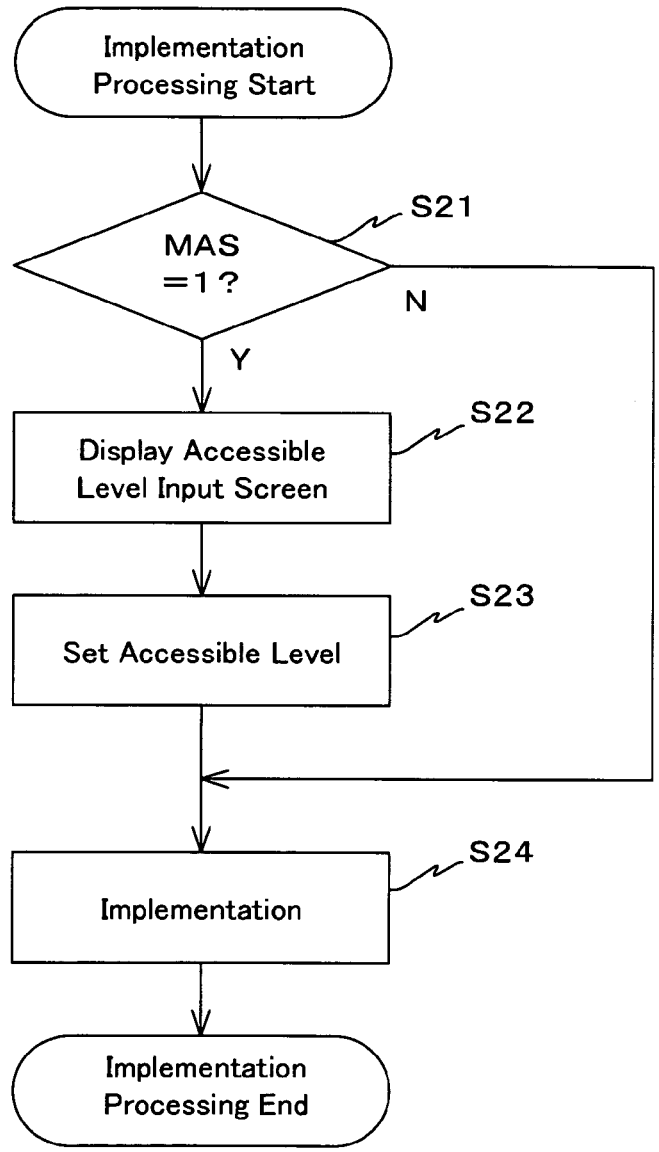

ID # RESOURCE ACCESS CONTROL FOR MOBILE TERMINAL

RELATED APPLICATION

This is a continuation application of the International Patent Application No. PCT/JP2004/006540 filed with Application date May 14, 2004.

BACKGROUND OF THE INVENTION

The present invention relates to a cooperative operation method, a mobile communication terminal thereof, a mail transceiving method, and a communication system. More particularly, the present invention relates to a cooperative operation method between a basic processing part and an application in the mobile communication terminal comprising the basic processing part to manage a predetermined resource, the mobile communication terminal which uses the cooperative operation method, the mail transceiving method which is used in the mobile communication terminal, and a communication system capable of using the mail transceiving method.

BACKGROUND ART

Conventionally, mobile communication terminals such as a cellular phones and so forth are finding widespread use. Functions and performances of the mobile communication terminal are remarkably improved, and now such mobile communication terminals have a function of allowing the user to enjoy games by executing downloaded applications via wireless communication route, not to mention its essential function, for example, the speech communication related functions and e-mail transceiving related processing function (to be also simply referred to as "mail" hereinafter).

In the mobile communication terminal, the basic function is executed by a control program called a basic processing part. Since the basic processing part carries the basic functions, the basic processing part manages various resources. Among the resources managed by the basic processing part, there are resources comprising information which should be confidential such as personal information of users, for example, a resource such as an address book and a mail box and the like as related to mail processing.

On the other hand, applications are also programs executed in the mobile communication terminal. However, in order to protect the personal information, such application is prohibited to use the resource having information designated as confidential. Therefore, the basic processing part executes solely processing such as mail processing by using the resource with confidential information.

SUMMARY OF THE INVENTION

Problems to be Solved by the Invention

The system such as the above-described conventional mobile communication terminal, which allows only the basic processing part to access the resource with confidential information and prohibits an application from accessing the resource, is excellent from the viewpoint of simply and properly keeping information in confidence such as personal information protection and so forth. However, the conventional access limit is a high barrier from the viewpoint of enabling to execute various kinds of applications to improve utility value of the mobile communication terminal.

For example, the basic processing part of the mobile communication terminal can neither select nor change the environment of mail processing for mail processing. Therefore, the environment of mail processing provided by the basic processing part (for example, access environment, display method, or the like) cannot be selected or changed in accordance with preference of the user.

Alternatively, the basic processing part is decided corresponding to each model of the mobile communication terminal. By this, the environment of mail processing also changes, when the user changes the model of the mobile communication terminal. For this reason, the changing of the model of the mobile communication terminal by the user causes a sense of incompatibility or poor usability for the user who was familiar with the mail environment of the old model.

As other issue, mails are prepared, transceived, or displayed by the basic processing part, when they exist according to the standard text format or extended format acceptable for the basic processing part. That is, mail comprising pictograms, ciphers, or images based on an original code system that is different from the standard one, cannot be transceived between a mail sender and a mail recipient.

As described above, the convenience of the conventional mobile communication terminal is poor, when the mail processing is considered as one example. This poor convenience is derived from limitations for the application to access freely any resources. In order to solve the problem, the limitation for the application must be removed to ensure free access by the application. However, it is a concern that confidential information may undesirably leak out, when applications are unconditionally allowed to access any resources comprising the confidential information by the application. In addition, there is possibility that the personal information might be altered to violate the intent of the user.

The present invention has been made in consideration of the above situation. The object of the present invention is to provide a method for cooperative operation, wherein the basic processing part of the mobile communication terminal and the application operate cooperatively, reasonably limiting the access by the application to the predetermined resources to be managed by the basic processing part in the execution of the application.

Another object of the present invention is to provide a mobile communication terminal, wherein the basic processing part of the mobile communication terminal and the application operate cooperatively, reasonably limiting the access by the application to the predetermined resources to be managed by the basic processing part in the execution of the application.

Still another object of the present invention is to provide a mail transceiving method to fulfill a mail transceiving environment, in which the convenience for the user of the mobile communication terminal is improved, Furthermore, still another object of the present invention is to fulfill the communication system to fulfill a mail transceiving environment, in which the convenience for the user of the mobile communication terminal is improved.

Means of Solving the Problems

As results of the studies, the present inventor obtained several findings that the responsibility for managing confidential information, for example, the personal information of the user of the mobile communication terminal, over which the user has ultimate control. Only the user can most reasonably judge the access limitation to a predetermined resource such as files in which the personal information and the like are stored. The present invention has been made on the basis of these findings.

That is, in the first aspect, the present invention is a cooperative operation method between a basic processing part and an application in a mobile communication terminal having the basic processing part to manage a predetermined resource, comprising the steps of: deciding a first expected access depending on an activation instruction of the application, wherein it is decided whether the application is expected to access the predetermined resource; displaying a first selection screen depending on the affirmative decision in the first access expectation decision step, wherein the first selection screen is displayed to a user for allowing him to choose to permit to activate the application or not; activating the application, wherein the application is activated depending on an activation permission instruction executed while the first selection screen is displayed; requesting an access for the predetermined resource, wherein the request for the predetermined resource is sent from the application to the basic processing part; accessing to the predetermined resource in response to the access request, wherein the basic processing part executes an access to the predetermined resource; and notifying the application of an access result in the access execution step.

In the cooperative operation method, it is decided whether the application is expected to access the predetermined resource in the first access expectation decision step, depending on the activation instruction of the application. The decision is performed by referring to, for example, attribute values added in installing the application.

If the decision in the first access expectation decision step is affirmative, the first selection screen is displayed to a user for allowing him to choose to permit to activate the application or not. Then, the application is activated in the activation step depending on an activation permission instruction instructed while the first selection screen is displayed. As a result, the application is activated in sole case, that is, when the user permits an application being expected to access the predetermined resource to access the predetermined resource, just prior to the execution of the program.

When thus activated application needs to access the predetermined resource, an access request to the predetermined resource is issued from the application to the basic processing part in the access request step. The basic processing part receives the access request and executes the requested access in response to the access request in the access execution step. Then, the basic processing part notifies the application of the access execution result in the result notification step. Herein below, the term "access execution result" means whether the access is normally executed or not, and additionally it means that the acquired information or the location of the information (for example, the address or the path to the file in which the information is stored), when the access request is the information acquisition request. In this specification, the term "access execution result" has such above meaning.

Consequently, it is possible to access the predetermined resource managed by the basic processing part from the application freely being selected or changed by the user. That is, the application is capable of accessing the predetermined resource in a reasonable range while cooperating with the basic processing part.

Accordingly, the basic processing part and application are capable of operating in cooperation with each other, while the access to the predetermined resource managed by the basic processing part of the mobile communication terminal is limited in the reasonable range, at the time of the execution in the mobile communication terminal.

The cooperative operation method of the present invention may further comprise steps of: deciding a second expected access, wherein it is decided whether the application is expected to access the predetermined resource, prior to installation of the application; displaying a second selection screen depending on an affirmative decision in the second access expectation decision step, wherein the second selection screen is displayed to a user for allowing him to choose to permit activation of the application or not in the second selection display step; and installing the application depending on an installation permission instruction performed while the second selection screen is displayed.

In this case, prior to the installation of the application, it is decided in the second access expectation decision step whether the application is expected to access the predetermined resource. The decision is performed by referring to, for example, values of access expectation parameters, which are described at a predetermined location of the application and represents access expectation of the application to the predetermined resource.

If the decision in the second access expectation decision step is affirmative, the second selection screen is displayed to a user for allowing him to choose to permit activation of the application or not in the second selection display step. Then, the application is installed in the installation step, when the installation permission instruction is input, while the second selection screen is displayed.

As a result, the application is installed in the sole case, that is, when the user permits the application being expected to access the predetermined resource to access the predetermined resource, just prior to the installation of the application. Accordingly, among the applications being expected to access the predetermined resource, those being decided to be dangerous by the user, may be excluded, prior to the installation.

The installation step may comprise: displaying a third selection screen, wherein the third selection screen is displayed to a user for allowing him to set an accessible level of the application for the predetermined resource; and setting an accessible level depending on an accessible level setting instruction while the third selection screen is displayed, wherein an instructed accessible level is set as the accessible level of the application for the predetermined resource setting an accessible level depending on an accessible level setting instruction performed while the third selection screen is displayed.

In this case, at the time of installing the application being expected to access the predetermined resource, the third selection screen is displayed in the third selection screen step to the user for allowing him to set an accessible level of the application for the predetermined resource. Herein below, the term "accessible level" means the following levels: for example, a level related to an accessible target, showing that the application is permitted to access to the resources depending on the level of confidential information such as high and low level confidential files; or a level related to an accessible form, showing that the application is permitted to change contents of the resources, such that the reading is solely permitted, or writing and deleting are further permitted. In the specification, the term "accessible level" is used with this meaning.

Then, the instructed accessible level is set as the accessible level of the application for the predetermined resource setting an accessible level, depending on the accessible level setting instruction performed while the third selection screen is displayed. The accessible level becomes the attribute of the installed application to be referred as that in various situations.

As a result, the accessible level, which is decided and set by the user, is referred in every accessing to the predetermined resource by the basic processing part. Therefore, the predetermined resource may be protected in a reasonable range and also more complex situations.

Alternatively, the cooperative operation method of the present invention may further comprise step of: displaying the fourth selection screen, wherein the fourth selection screen is displayed to the user for allowing him to choose whether the basic processing part permits a change request of the contents for the predetermined resource by the application or not, prior to the access execution step, when it is detected that the access request comprises the change request of contents of the predetermined resource; wherein the access step is executed depending on a change permission instruction performed while the fourth selection screen is displayed. Herein below, the term "change of the contents of the resource" means simply additing or rewriting the contents by the application and also deleting a part or entire contents of the predetermined resources by the application. In the specification, the expression "change of the contents of the resource" has this meaning.

In this case, the fourth selection screen is displayed in the forth selection display step to a user for allowing him to choose whether the basic processing part permits a change request of the contents for the predetermined resource by the application or not, when it is detected that the change request of the contents of the predetermined resource is issued by the application during execution of the application depending on the activation permission instruction. Then, the access step is executed, when the change permission instruction is performed by the user referred the forth selection display to change the contents of the predetermined resources.

As a result, the contents of the predetermined resource are changed in the sole case, that is, when the user permits the change of the contents of the predetermined resource as the access protection target. Accordingly, the contents of the predetermined resource may be protected within a strictly reasonable range.

Alternatively, the cooperative operation method of the present invention may further comprise a step of notifying an event wherein the basic processing part notifies the application of the event, when an event related to the access request is detected after the result notification. In this case, the application is notified of not only the start of transceiving as the execution result corresponding to the access request but also an event such as completion of transceiving or failure of transceiving which occurs after the start of transceiving, when the predetermined resource is used as the mail processing resource, and the mail transceiving request is issued as the access request. As a result, the application can manage all situations of operations related to the access request.

Furthermore, in the cooperative operation method of the present invention, the predetermined resource may comprise at least a part of the mail processing resources. The term "mail processing resources" means the resources related to mail processing (for example, address books, mail boxes, a transmission protocol control unit, a reception protocol control unit, and so forth). In the specification, the term "mail processing resource" has this meaning.

In this case, the access to the mail processing resource managed by the basic processing part of the mobile communication terminal may be limited in the reasonable range, when the application for mail processing in the mobile communication terminal is newly installed and executed. Accordingly, the mail processing environment friendly for the user of the mobile communication terminal may be created, while appropriately protecting personal information and the like.

Wherein, the access request may be performed by the application in accordance with the mail processing request instruction by the user.

Alternatively, the access request may comprise the access request for the information related to the mail, that for the mail transmission resources, and that for the mail reception resources.

In the second aspect, the present invention is a mobile communication terminal comprising: a basic processing part which manages a predetermined resource; and an execution environment part, wherein an access request to the predetermined resource by an application different from the basic processing part is transmitted to the basic processing part, and an execution result by the basic processing part in response to the access request is notified of the application; the basic processing part comprising: a first access expectation decision means for deciding a first expected access depending on an activation instruction of the application, wherein it is decided at first whether the application is expected to access the predetermined resource; a first selection screen means for displaying a first selection screen depending on the affirmative decision by the first access expectation decision step, wherein the first selection screen is performed to a user for allowing him to choose to permit to activate the application or not; and activation means for activating the application, wherein the application is activated depending on an activation permission instruction executed while the first selection screen is displayed setting an accessible level depending on an accessible level setting instruction while the third selection screen is displayed, wherein an instructed accessible level is set as the accessible level of the application for the predetermined resource while the third selection screen is displayed.

In this mobile communication terminal, the first access expectation decision means decides whether the application is expected to access the predetermined resource, when the user performs the activation instruction of the application. When the decision is affirmative, the first selection screen is performed to a user for allowing him to choose to permit to activate the application or not. Then, the activation means activates the application, when the activation permission instruction is performed, while the first selection screen is displayed.

The access request to the predetermined resource from the application to the basic processing part is transmitted to the basic processing part through the execution environment part, when the activated application needs to access the predetermined resource. Subsequently, the basic processing part receives the access request executes the requested access, in response to the access request. Then, the basic processing part notifies the application of the access execution result through the execution environment part.

That is, in the mobile communication terminal of the present invention, the basic processing part and the application operate cooperatively by using the above-mentioned cooperative operation method of the present invention. Accordingly, the basic processing part and application may operate in cooperation with each other; while access to the predetermined resource managed by the basic processing part is limited in a reasonable range.

In the mobile communication terminal of the present invention, the basic processing part may further comprise steps of: a second access expectation decision means for, deciding whether the application is expected to access the predetermined resource prior to implementation of the application; a second selection screen means for displaying second selection screen depending on an affirmative decision in the second access expectation decision step, wherein the second selection screen is displayed to a user for allowing him to choose to permit activation of the application or not; and installation means for installing the application, when an installation permission instruction is input while the second selection screen is displayed.

In this case, prior to the installation of the application, the second access expectation decision means decides whether the application is expected to access the predetermined resource. If the decision is affirmative, the second selection screen is provided to a user for allowing him to choose to permit activation of the application or not. Then, the application is installed in the installation means, when the installation permission instruction is performed, while the second selection screen is displayed. Accordingly, among the applications being expected to access the predetermined resource, those being determined to be dangerous by the user, may be excluded, prior to the installation.

Wherein, the installation means comprises: a third selection screen means for displaying a third selection screen, wherein the third selection screen is displayed to a user for allowing him to set an accessible level of the application for the predetermined resource; and an accessible level setting means for setting an accessible level depending on an accessible level setting instruction while the third selection screen is displayed, wherein an instructed accessible level is set as the accessible level of the application for the predetermined resource while the third selection screen is displayed.

In this case, at the time of installing the application being expected to access the predetermined resource, the third selection screen is displayed to a user for allowing him to set an accessible level of the application for the predetermined resource. Then, the accessible level setting means sets the instructed accessible level as the accessible level of the application to the predetermined resource, when the user inputs an accessible level setting instruction in accordance with the display of the third selection screen. As a result, the accessible level, which is decided and set by the user, is referred in every accessing to the predetermined resource by the basic processing part. Therefore, the predetermined resource may be protected in the reasonable range and also more complex situations.

Alternatively, in the mobile communication terminal of the present invention, the basic processing part may further comprise a fourth selection screen means for displaying the fourth selection screen to prompt the user to select to permit a change request of the contents for the predetermined resource by the application, prior to the access to the predetermined resource by the access execution means, when it is detected that the access request comprises the change request of contents for the predetermined resource.

In this case, the fourth selection screen is displayed in a forth selection display step to the user for allowing him to choose whether the fourth display means permits the change request of the contents for the predetermined resource by the application or not, when it is detected that the change request of the contents of the predetermined resource is issued by the application during execution of the application depending on the activation permission instruction. Then, contents of the predetermined resources are changed, when the change permission instruction is performed by the user referred the forth selection display. Accordingly, the contents of the predetermined resource may be protected strictly reasonable range.

The execution environment part may comprise a change request decision means for deciding whether the access request comprises the change request of the contents for the predetermined resource, and requesting the basic processing part to execute the fourth selection screen, when the decision result is affirmative. In this case, the fourth selection screen means displays the fourth selection means to a user for allowing him to choose to permit a change request of the contents for the predetermined resource by the application in response to the request from the change request decision means. The change request decision means may be arranged in the basic processing part.

In the mobile communication terminal of the present invention, the execution environment part may comprise an access right decision means for deciding whether the application has a right to access the predetermined resource in accordance with the access request, depending on the access request received by the execution environment part. In this case, the access right decision means in the execution environment part decides whether the application has a right to access the predetermined resource in accordance with the access request, when the execution environment part receives the access request. If the decision result is affirmative, the execution environment part notifies the basic processing part of the access request. On the other hand, if the decision result is negative, the execution environment part does not notify the access right, and notifies the application that the access request received is invalid and there is a violation of access protection Note that the access right decision means may be arranged in the basic processing part.

In the mobile communication terminal of the present invention, the execution environment part may comprise the constitution, wherein the execution environment part further notifies the application of the event related to the access request, which occurs after the result notification and is detected by the basic processing part. In this case, the application can manage all situations of operations related to the access request.

In the mobile communication terminal of the present invention, the predetermined resource may include at least a part of the mail processing resources. In this case, at the time of executing the mailer application in the mobile communication terminal, the basic processing part and application may execute the mail processing operation in cooperation with each other, while the access to the mail processing resource managed by the basic processing part of the mobile communication terminal is limited in the reasonable range. Accordingly, the mail processing environment friendly for the user of the mobile communication terminal may be installed.

According to the third aspect, the present invention is an access protection program for restricting access to a predetermined resource managed by a basic processing part in a mobile communication terminal, wherein the program is used by a control computer of the mobile communication terminal to execute following procedures: a first access expectation decision procedure for deciding whether the application is expected to access the predetermined resource, when an activation instruction that instructs to activate an application different from the basic processing part is performed; a first selection screen procedure for executing a first selection screen to prompt a user to select whether to permit activation of the application, when the decision in the first access expectation decision procedure is affirmative; and an activation procedure for activating the application, when an activation permission instruction is performed while the first selection screen is displayed.

Since the access protection program is executed by the mobile communication terminal, the application is activated when the user solely permits the application being expected to access the predetermined resource to access the predetermined resource, just prior to the execution of the program. Accordingly, the basic processing part and application can operate in cooperation with each other, while the access to the predetermined resource managed by the basic processing part of the mobile communication terminal is limited in the reasonable range in executing the application in the mobile communication terminal.

In the access protection program of the present invention, the program may further comprise the constitution that the control computer further executes: a second access expectation decision procedure for deciding whether the application is expected to access the predetermined resource, prior to the installation of the application; a second selection screen procedure for executing the second selection screen to prompt the user to select whether to permit installation of the application, when the decision in the second access expectation decision procedure is affirmative; and an installation procedure for installing the application, depending on the installation permission instruction while the second selection screen is displayed.

In this case, the application is installed, when the user solely permits the application being expected to access the predetermined resource to access the predetermined resource, just prior to the installation of the program. Accordingly, among the application being expected to access to the predetermined resources, an application being determined dangerous by the user may be excluded prior to the installation.

Wherein, the control computer may further execute a procedure for deciding whether the application is expected to access the predetermined resource by referring to the value of the access expectation parameter being described at the predetermined location in the application and represents access expectation of the application to the predetermined resource, when the second access expectation determination procedure is executed.

Alternatively, in the installation procedure, the control computer may further execute the third selection screen procedure for executing the third selection screen to prompt the user to set an accessible level of the application to the predetermined resource; and an accessible level setting procedure for setting an instructed accessible level as the accessible level of the application to the predetermined resource when an accessible level setting instruction is input during display of the third selection screen.

In this case, the basic processing part refers the accessible level determined and set by the user every time the application accesses the predetermined resource. Therefore, the predetermined resource may be protected in both a reasonable range and also more complex forms.

Furthermore, in the access protection program of the present invention, the control computer may further execute a fourth selection screen procedure for executing a fourth selection screen to prompt the user to select whether to permit a change request of the contents of the predetermined resource by the application before access to the predetermined resource, when it is decided that the access request from the application comprises the change request of contents for the predetermined resource.

In this case, the contents of the predetermined resource are changed, when the user solely permits the change of the contents of the predetermined resource as the access protection target. Accordingly, the contents of the predetermined resource may be protected in a strictly reasonable range.

In the access protection program of the present invention, the predetermined resource may comprise at least a part of the mail processing resources. In this case, when the mailer application in the mobile communication terminal is executed, the basic processing part and application can execute the mail processing operation in cooperation with each other, while the access to the mail processing resource managed by the basic processing part of the mobile communication terminal is limited in the reasonable range. Accordingly, a mail processing environment friendly for the user of the mobile communication terminal may be created.

In the fourth aspect, the present invention is an execution environment program providing an execution environment to an application in a mobile communication terminal comprising a basic processing part to manage a predetermined resource, wherein the program is used by a control computer of the mobile communication terminal to execute following procedures: a procedure for deciding whether the application has an access right to access the predetermined resource in accordance with the access request, when an access request to the predetermined resource from the application is received; a procedure for transmitting the access request to the basic processing part, when it is decided that the application has the access right; and a procedure for notifying the application of an execution result by the basic processing part in response to the access request.

According to the execution environment program, the function of the execution environment part in the mobile communication terminal of the present invention may be realized. Accordingly, the cooperative operation between the basic processing part and the application in the mobile communication terminal may be executed smoothly by using the execution environment program of the present invention.

In the execution environment program of the present invention, the control computer further executes a procedure for deciding whether the access request comprises a change request of contents for the predetermined resource, and requesting the basic processing part to execute a display to prompt a user to select whether to permit the change request of the contents of the predetermined resource by the application, when a decision result is affirmative, by using the program.

In the execution environment program of the present invention, the control computer may further execute a procedure for notifying the application of an event related to the access request, which occurs after the result notification and is detected by the basic processing part by using the program. In this case, the application is notified all of the situations of the operation related to the access request.

Alternatively, in the execution environment program of the present invention, the predetermined resource may comprise at least a part of the mail processing resources. In this case, the application may access the mail processing resource in cooperation with the basic processing part. Therefore, a mail processing environment friendly for the user may be created.

In the fifth aspect, the present invention is a mailer application program which is used in a mobile communication terminal comprising a basic processing part to manage a mail processing resource, wherein a control computer of the mobile communication terminal executes the following procedures by using the program: a procedure for issuing an access request for accessing to the mail processing resource to the basic processing part; and a procedure for receiving an access result of the mail processing resource from the basic processing part.

According to the mailer application program, the above-mentioned access protection program and execution environment program of the present invention are combined to operate, thereby accessing the mail processing resource in the reasonable range. Therefore, the mailer application program of the present invention may create a mail processing environment friendly for the user.

In the mailer application program of the present invention, the control computer may further execute a procedure for receiving an event related to the access request, which occurs after the access result is received and is detected by the basic processing part by using the program. In this case, the mailer application program may manage all situations of operations related to the access request.

In the sixth aspect, the present invention is a method for transceiving a mail to transceive mails between the first communication terminal and the second communication terminal, wherein at least one of the communication terminal is the mobile communication terminal of the present invention; and the first communication terminal comprising a first application and a first basic processing part to manage a first mail processing resource, and the second communication terminal comprising a second application equal to the first application and a second basic processing part to manage a second mail processing resource, wherein the method comprises: requesting a mail transmission, wherein the first basic processing part requests the transmitting of a mail, of which content is a mail data created by the first application, to the first basic part; transmitting a mail, wherein the first basic processing part transmits the mail to the second communication terminal, depending on the reception of the mail transmission request; receiving the mail, wherein the second basic processing part receives the mail; acquiring the mail data, wherein the second application transmits the request to acquire the mail data of the mail; and notifying of the mail data, wherein the second basic processing part received the mail data acquisition request notifies the second the mail data of the mail data.

In this mail transceiving method, the first application requests the first basic processing part to transmit mail containing mail data created by the first application as contents in the mail transmission request step. Herein, the first application prepares contents of the mail text or the attached file in optional format, without considering whether the format can be decoded by the second basic processing part, unless they are not decodable by the second application.

Next, in the mail transmission execution step, the first basic processing part received the mail transmission request transmits the mail to the second communication terminal. By this, the mail transmitted from the first communication terminal is received by the second basic processing part of the second communication terminal receives the mail in the mail reception step. Then, the second application requests the second basic processing part to acquire the mail data of the mail in the mail data acquisition request step, after that, the second basic processing part received the mail data acquisition request notifies the second application of the mail data in the mail data notification step. Then, the second application decodes the mail data and displays the decoding result on the display unit to notify the user of the second communication terminal of the mail contents.

As a result, the user of the first communication terminal may transmit to one of the second communication terminal any type of mail, even if the mail being composed of the data in the original format, wherein the first basic processing part neither being capable of preparing the mail nor the second basic processing part capable of decoding, and the user of the second communication terminal may receive it. Alternatively, even when mail contains the original format data, which should be sent from the first communication terminal to the second communication terminal, is received by another user, the user of the communication terminal received the mail except the second communication terminal, cannot read the contents of the mail and the contents of them is kept in secret, unless the same application is installed in the terminal.

Accordingly, the mail transceiving method of the present invention may use a mail transceiving environment with improved convenience for the users of the mobile communication terminals.

In the seventh aspect, the present invention is a communication system comprising: the first communication terminal of the present invention, and the second communication terminal capable of transceiving the mail between the first communication terminal, wherein the first communication terminal comprises a first basic processing part to manage the first mail processing resource and the first application, wherein the first basic processing part accesses to the first mail processing resource in response to an access request to the first mail processing resource from the first application; and the second communication terminal comprising the second basic processing part to manage the second mail processing resource and the second application equal to the first application, as well as the second basic processing part accesses to the second mail processing resources, depending on the access request to the second mail processing resource from the second application.

In the communication system, the first basic processing part accesses to the first mail processing resource in response to the access request for the first mail processing resource from the first application, wherein the first basic processing part is installed in the first communication terminal of the present invention for managing the first mail processing resource, and the first application is installed in the first communication terminal. Alternatively, the second basic processing part accesses to the second mail processing resource in response to the access request to the second mail processing resource from the second application, wherein the second basic processing part is installed in the second communication terminal capable of transceiving mail between the first communication terminal for managing the second mail processing resource, and the second application is equal to the first application.

Since mail data is transceived between the first application and the second application, the above-described mail transceiving method of the present invention may be used. Accordingly, the communication system of the present invention creates a mail transceiving environment with improved convenience for the users of the mobile communication terminal.

Effects of the Invention

As explained above, the cooperative operation method of the present invention achieves the advantageous effect that at the time of executing the application in the mobile communication terminal, the basic processing part and application may operate in cooperation with each other, while the access to the predetermined resource managed by the basic processing part of the mobile communication terminal is limited in the reasonable range.

Alternatively, the mobile communication terminal of the present invention achieves the advantageous effect that at the time of executing the application in the mobile communication terminal, the basic processing part and application may operate in cooperation with each other, while the access to the predetermined resource managed by the basic processing part of the mobile communication terminal is limited in the reasonable range.

Furthermore, the access protection program of the present invention achieves the advantageous effect that at the time of executing the application in the mobile communication terminal, the basic processing part and application may operate in cooperation with each other, while the access to the predetermined resource managed by the basic processing part of the mobile communication terminal is limited in the reasonable range.

The execution environment program of the present invention achieves the advantageous effect that the execution environment may be provided to an application by combining the program with the access protection program of the present invention to execute them at the time of executing the application in the mobile communication terminal, wherein the basic processing part and the application may operate in cooperation with each other, while the access to the predetermined resource managed by the basic processing part of the mobile communication terminal is limited in the reasonable range.

Alternatively, the mailer application program achieves the another advantageous effect that the at the time of executing the application in the mobile communication terminal, the basic processing part and the application may operate in cooperation with each other, while the access to the predetermined resource managed by the basic processing part of the mobile communication terminal is limited in the reasonable range, when the access protection program, and execution environment program are used in combination.

According to the mail transceiving method of the present invention, the advantageous effect the mail transceiving environment with improved convenience is provided for the users of mobile communication terminals.

According to the communication system of the mobile communication terminal, the mail communication may be executed, while realizing the mail transceiving environment with improved convenience for users.

BRIEF DESCRIPTION OF THE DRAWINGS

FIG. 2A is a front view of the external appearance of the cellular phone according to the embodiment of the present invention;

FIG. 2B is a rear view of the outer appearance of the cellular phone according to the embodiment of the present invention;

FIG. 5 is a flowchart for explaining download processing;

FIG. 7 is a flowchart for explaining installation processing;

DETAILED DESCRIPTION

Figure 1:
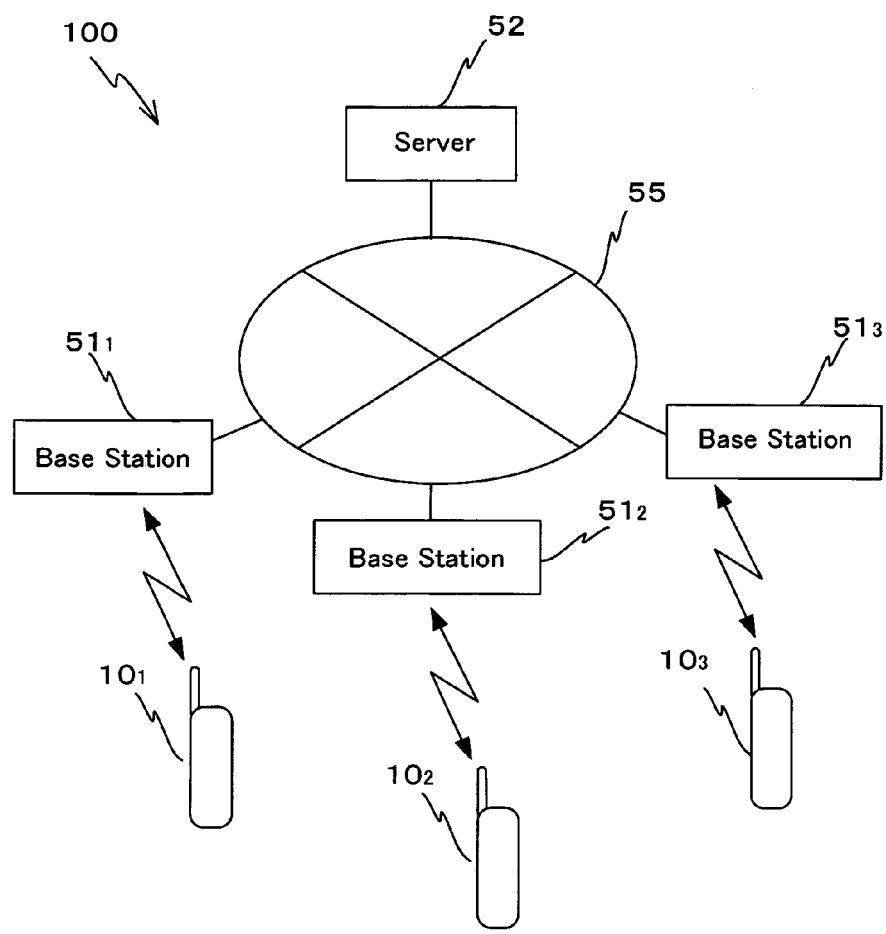
FIG. 1 is a view schematically showing the configuration of the communication system according to an embodiment of the present invention.

An embodiment of the present invention will be described below with reference to FIGS. 1 to 19. The same reference numerals denote the same or similar elements, and a repetitive description thereof will be omitted.

<Configuration>

FIG. 1 schematically shows the configuration of the communication system 100 according to an embodiment of the present invention. As shown in FIG. 1, the communication system 100 comprises (a) cellular phones $10_1$, $10_2$, and $10_3$, (b) base stations $51_1$, $51_2$, and $52_3$ which wirelessly communicate with the cellular phones $10_1$, $10_2$, and $10_3$, respectively, (c) the server 52 which manages mail transfer between the cellular phones $10_1$, $10_2$, and $10_3$, and (d) the network 55 which connects the base stations $51_1$, $51_2$, and $52_3$ and the server 52 to each other.

Note that a plurality of types of servers manage cooperatively in actual communication systems, but FIG. 1 shows a simple configuration comprising one server. For the descriptive convenience, just three cellular phones $10_1$, $10_2$, and $10_3$ are illustrated in FIG. 1 as mobile communication terminals. However, four or more cellular phones may transceive mails through the network 55. Alternatively, a communication terminal, except a cellular phone, may also transceive the mail through the network 55.

Figure 3:
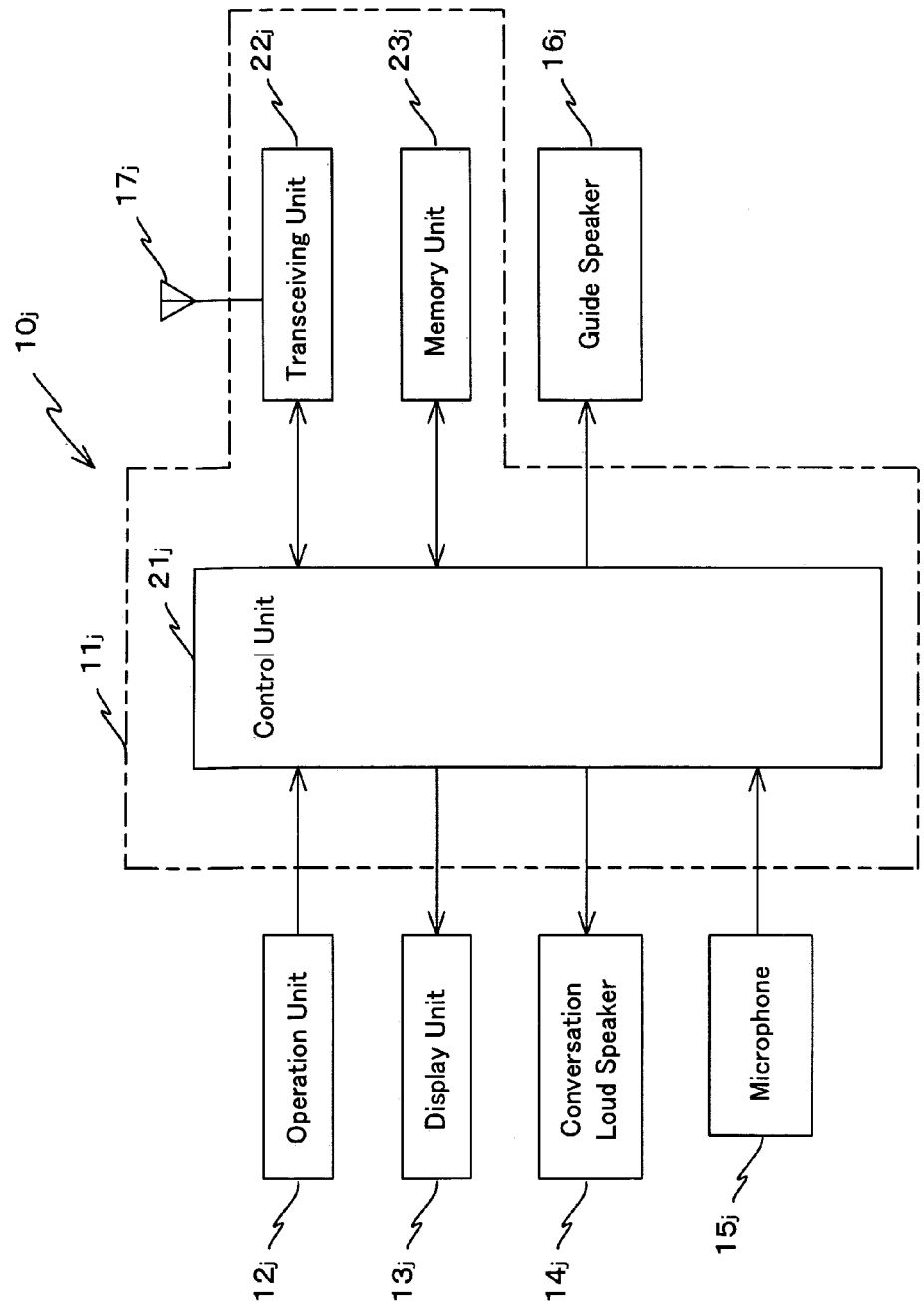
FIG. 3 is a functional block diagram of the cellular phone according to the embodiment of the present invention.

The cellular phones $10_1$, $10_2$, and $10_3$ have the almost same hardware configuration as generally shown in FIGS. 2A, 2B, and 3. FIG. 2A is the front view of the external appearance of the cellular phone $10_j$ (j=1 to 3). FIG. 2B is the rear view of the external appearance of the cellular phone $10_j$. FIG. 3 is the functional block diagram of the hardware of the cellular phone $10_j$.

As comprehensively shown in FIGS. 2A, 2B, and 3, the cellular phone $10_j$ comprises (a) the cellular phone body $11_j$ having the control unit $21_j$, the transceiving unit $22_j$, and the memory unit $23_j$, (b) the operation unit $12_j$ having a ten-key pad to input telephone numbers to the control unit $21_j$ and function keys to input various kinds of instructions for example, operation mode switching to the control unit $21_j$ and the like, and (c) the display unit $13_j$ having a liquid crystal display to display an operation guide, operation status, and received message in accordance with an instruction from the control unit $21_j$. The cellular phone $10_j$ also comprises (d) the conversation loud speaker $14_j$ playing back a speech signal transmitted from a communication partner during conversation, (e) the microphone $15_j$ for inputting speech during conversation, (f) the guidance loudspeaker $16_j$ for generating a ring tone or guidance tone in accordance with instructions from the control unit $21_j$. The cellular phone $10_j$ also comprises (g) the antenna $17_j$ being connected to the transceiving unit $22_j$ to transceive radio signals with a base station.

Figure 4:
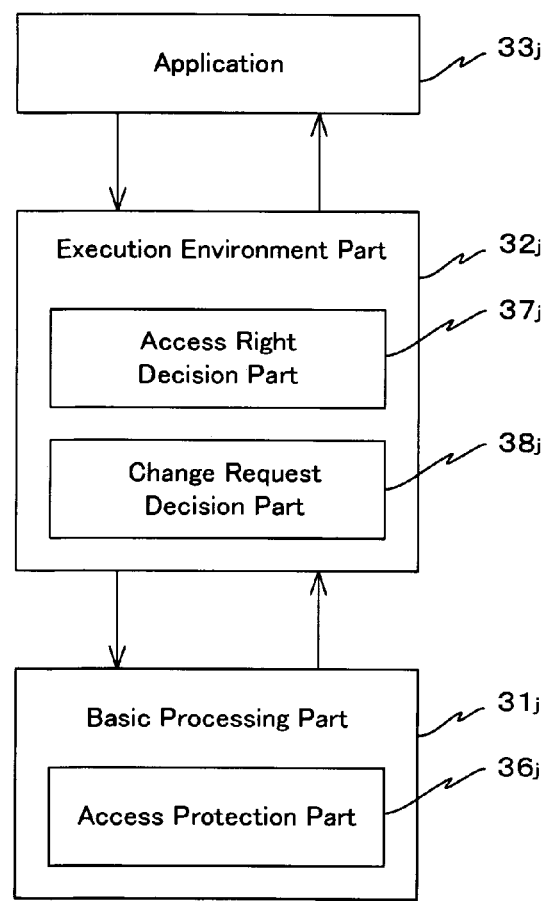
FIG. 4 is a block diagram schematically showing the configuration of software, which operates in a control unit in FIG. 3.

The control unit $21_j$ comprises a central processing unit (CPU), a digital signal processor (DSP), and so forth, and performs various types of data processing and controls the operations of the other components described above, in order to realize general cellular phone functions. FIG. 4 shows the configuration of software such as a program executed by the control unit $21_j$.

That is, the software of the control unit $21_j$ comprises (i) the basic processing part $31_j$ for installing the basic function of the cellular phone, such as the speech communication function, the mail function, and so forth, as well as for controlling the above-mentioned a variety kinds of hardware resources, (ii) the application $33_j$ for providing a variety of contents such as the game or the like for the user, and (iii) the execution environment part $32_j$ for positioned between the basic processing part $31_j$ and the application $33_j$, and for providing the execution environment of the application $33_j$.

The basic processing part $31_j$ comprises the access protection part $36_j$ for limiting access to the resources being managed by the basic processing part, depending on the request from the application $33_j$. Alternatively, the execution environment part $32_j$ comprises a set of programs for providing software resources in order to execute the application such as command conversion between the application $33_j$ and the basic processing part $31_j$, and management of the application $33_j$.

The execution environment part $32_j$ comprises the access right decision part $37_j$ and change request decision part $38_j$. Herein, the access right decision part $37_j$ decides whether the application $33_j$ issued the access request to the resource as the access protection target has the right to access the resource based on the access request. Alternatively, the change request decision part $38_j$ decides whether the access request from the application $33_j$ comprises the change request for the contents of the resource as the access protection target. If the decision result is affirmative, the execution environment part $32_j$ requests to the basic processing part $31_j$ for performing the display to a user for allowing him to choose whether the change of the contents in the resources is permitted or not.

The basic processing part $31_j$ and execution environment part $32_j$ are installed in the cellular phone already at the time of shipment from the factory. The application $33_j$ is either preinstalled or downloaded from the transceiving unit $22_j$ to be installed by user's operation of the operation unit $12_j$. Assume that the application $33_j$ is assumed to be a downloaded application in the following description. Furthermore, the number of the application in the cellular phone $10_j$ is not limited to one, however, the application $33_j$ is solely shown comprehensively in FIG. 4.

Note that the application $33_j$ (j=1 to 3) is mailer application in the following description. Herein, the application $33_1$ and application $33_2$ are equal mail processing applications, both of which have the almost same mail decoding function. However, the application $33_3$ has a different mail decoding function from that of the applications $33_1$ and $33_2$.

Between the basic processing part $31_j$ and execution environment part $32_j$, information such as the request, the response, or the event or the like, related to the application $33_j$ is appropriately exchanged. Alternatively, between the execution environment part $32_j$ and the application $33_j$, various kinds of requests sent from the application $33_j$ is sent to the execution environment part $32_j$, and responses or event generations from the execution environment part $32_j$ are notified to the application $33_j$.

<Installation of Application>

Next, the installation of the application $33_j$ into the cellular phone $10_j$ of the communication system 100 having the above-described configuration will be described.

Assume that the access protection described in below is applied to the access to resources being managed by the basic processing part $31_j$ such as the mail box, the address book, and the data holder, which are not shown in Figure for the cellular phone $10_j$. Furthermore, the resource requires access protection in particularly high level (for example, the mail box or the address book and the like related to the personal information), is referred to as a high-level protection resource. Other resources except the high-level protection resource and being as the access protection target is referred to as a low-level protection resource.

Alternatively, assume that the application $33_j$ is a JAVA (registered trademark) application comprising JAD file and JAR file. A parameter MAS located at the predetermined address in the JAD file represents whether the application is expected to access the resource as the access protection target. Note that the value of the parameter MAS, "1" shows that the application $33_j$ is expected to access the resource as the access protection target, and on the other hand, that, "0" shows that the application $33_j$ is not expected to access the resource as the access protection target. The value of the parameter MAS is set by the programmer of the application. However, the value may be set automatically by checking the contents of the application by using tool programs.

In the embodiment, the application $33_j$ is installed in the cellular phone $10_j$ as follows:

At first, the download processing starts, when the download of the desired application $33_j$ is instructed by the user through operation of the operation unit $12_j$, referring to the display unit $13_j$.

In the download processing, as shown in FIG. 5, the JAD file of the application $33_j$ is acquired by the basic processing part $31_j$ in step S11. Subsequently, in step S12, the access protection part $36_j$ in the basic processing part $31_j$ decides whether the value of the parameter MAS in the acquired JAD file is "1" or not. If the decision in the step is affirmative, the flow advances to step S13.

Figure 6A:
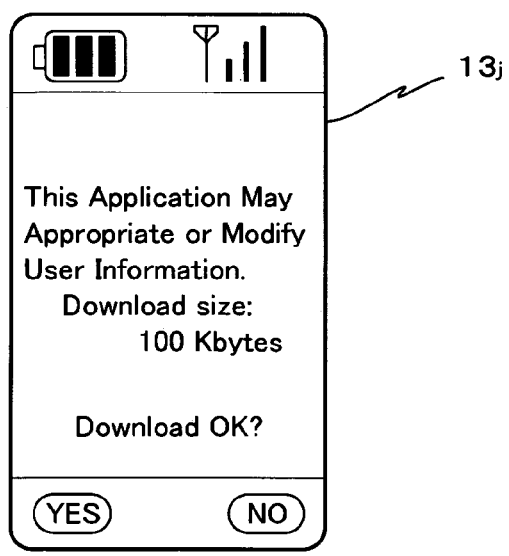
FIG. 6A is a view showing a display example of a download permission input screen in the download processing.

In step S13, a screen for a download permission input, wherein the value of the parameter MAS in the JAD file (to be also referred to as a "download permission input screen 1" hereinafter) is "1", is displayed on the display unit $13_j$ by the access protection part $36_j$. The example of the download permission input screen 1 is shown in FIG. 6A. In accordance with the guidance in the download permission input screen 1, the user performs the designated inputs for permitting the download or not. In the example shown in FIG. 6A, the download is permitted depending on the input, "YES", and not permitted depending on the input, "NO".

Referring back to FIG. 5, the access protection part $36_j$ decides in step S14 whether the designated input is download permission or not, when the download permission or no permission is performed as the designated input by the user. If the decision is negative, the download processing is terminated without executing the download.

If the decision in step S14 is affirmative, the flow advances to step S15. In step S15, the JAR file of the application $33j$ is acquired by the basic processing part $31_j$. Thus, the download processing is terminated after both of files JAD and the JAR file composing of the application $33j$ are acquired.

Figure 6B:
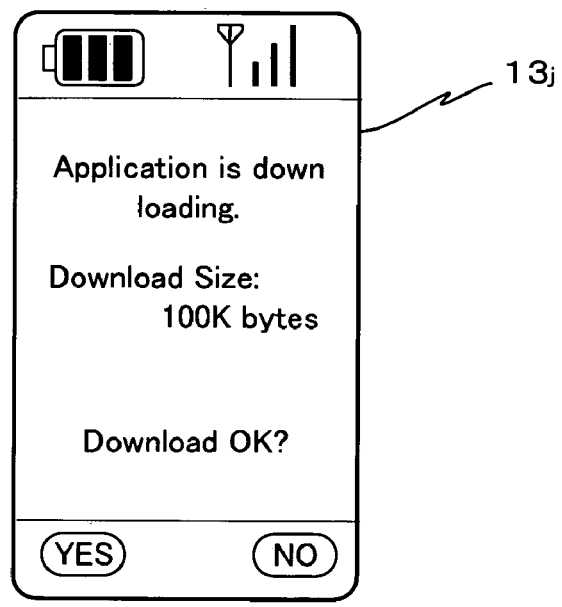
FIG. 6B is a view showing another display example of the download permission input screen in the download processing.

If the decision in step S12 is negative, the flow advances to step S16. In step S16, the screen for download permission input, wherein the value of the parameter MAS in the JAD file (to be also referred to as a "download permission input screen 2" hereinafter) is "0", is displayed on the display unit $13_j$ by the access protection part $36_j$. An example of the download permission input screen 2 is shown in FIG. 6B. In accordance with the guidance in the download permission input screen 2, the user performs the designated inputs for permitting the download or not. Note that in the example shown in FIG. 6B, the download is permitted depending on the input, "YES", and not permitted depending on the input, "NO".

Referring back to FIG. 5, the access protection part $36_j$ decides in step S17 whether the designated input is download permission or not. If the decision in the step is negative, the download processing is terminated without executing the download.

If the decision in step S17 is affirmative, the flow advances to step S15. In step S15, the JAR file of the application $33j$ is acquired. Thus, the download processing is terminated after both of files JAD and the JAR file composing of the application 33 are acquired.

The installation processing of the application $33_j$ is executed after the download processing of the application $33_j$ is terminated.

In the installation processing, as shown in FIG. 7, the access protection part $36_j$ in the basic processing part $31_j$ decides in step S21 whether the value of the parameter MAS in the acquired JAD file of the application $33_j$ is "1" or not. If the decision in the step is negative, the flow advances to step S24. In step S24, the application $33_j$ is installed into the control unit $21_j$ by the access protection part $36_j$. Then, the installation processing is completed.

Figure 8:
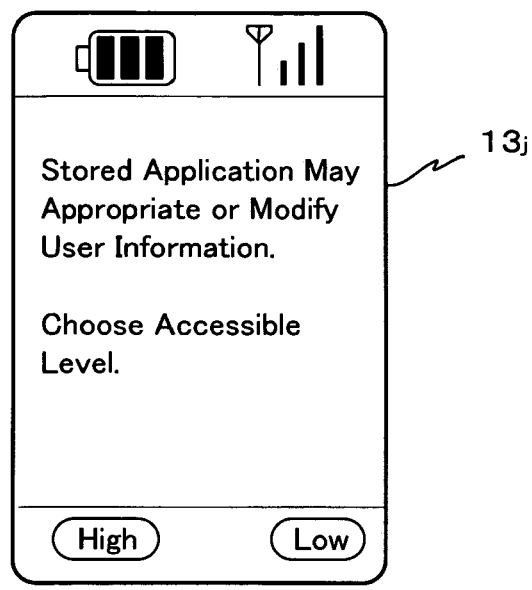
FIG. 8 is a view showing a display example in the installation processing.

If the decision in step S21 is affirmative, the flow advances to step S22. In step S22, a screen for accessible level input (to be also referred to as an "accessible level input screen" hereinafter) is displayed by the access protection part $36_j$. The example of the accessible level input screen is shown in FIG. 8. In accordance with the guidance in the accessible level input screen, the user performs the designated input of the accessible level permitted for the application $33j$.

Note as an example, two accessible levels, high and low, are selectable as the accessibility level is shown in FIG. 8. In the following explanation, assume that either of the accessible levels can be set. The application is permitted to access all resources comprising the high-level protection resources, when the accessible level is set to "high". In contrast, the application is permitted to the access resources except the high-level protection resources, when the accessible level is set to "low".

Referring back to FIG. 7, based on the accessible level selection by the user, the selected accessible level is set as the attribute for the application $33j$ by the access protection part $36_j$ in step S23. Note that the following explanation is performed on the assumption that the application $33_j$ is set to the accessible level "high" in this embodiment. After that, the application $33_j$ is installed in step S24, and then, the installation processing is completed.

<Access Protection Operation>

Next, access protection for the resources managed by the basic processing part $31_j$, which is executed in each cellular phone $10_j$ (j=1 to 3), is explained. Herein below, there is mentioned as the example for the access protection for the resource (to be referred to as a "mail processing related information resource" hereinafter), wherein the mail processing related information should be protected from the access by the application $33_j$ is stored. In the mail processing related information, the address book, the mail box, and so forth are comprised.

In order to start the operation of the application $33_j$, an activation instruction of the application $33_j$ in the cellular phone $10_j$ is input by the user. The instruction from the user is performed through the operation unit 12, being referred to the display unit 13.

Figure 9:
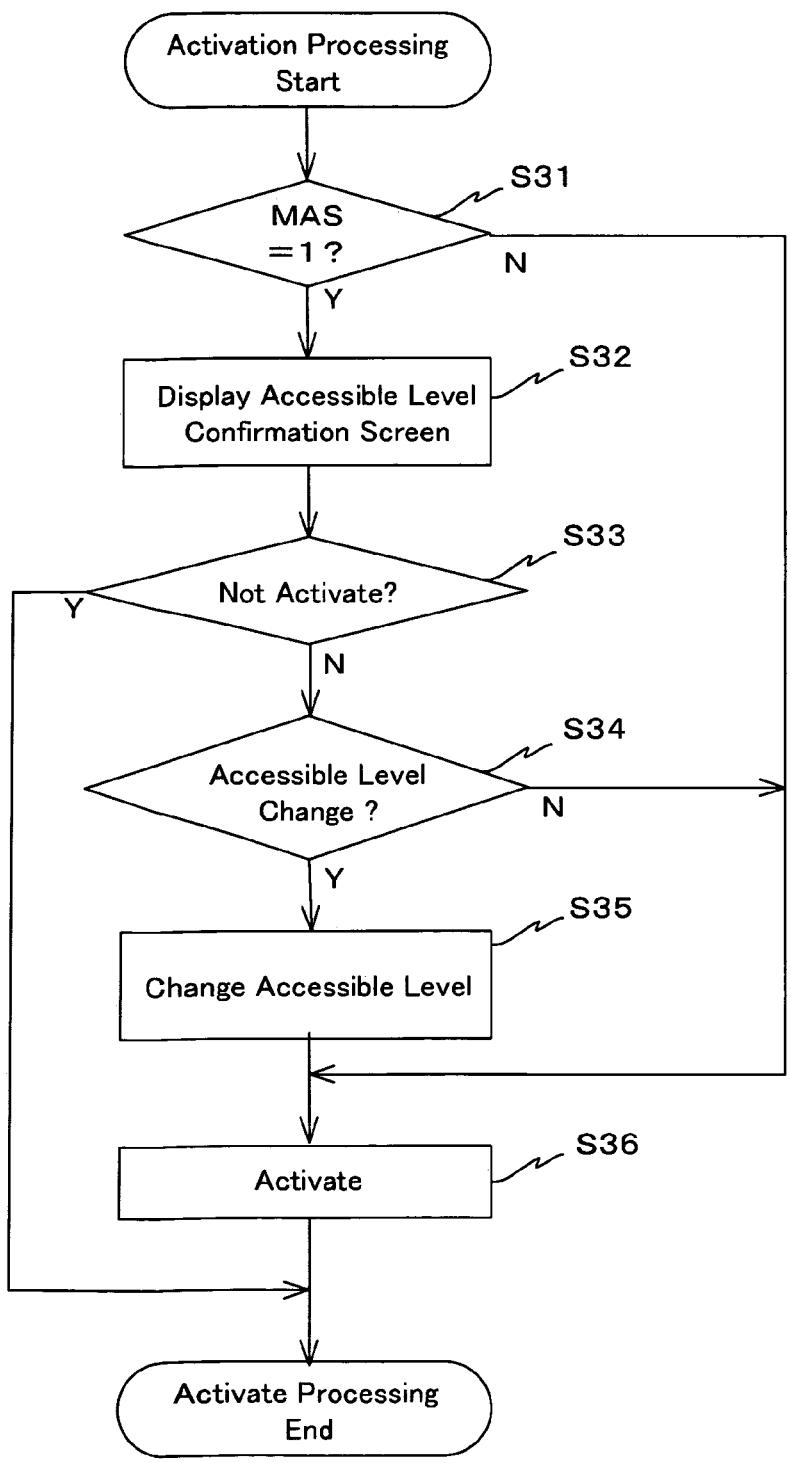
FIG. 9 is a flowchart for explaining activation processing.

When the activation instruction of the application $33_j$ is input, in step S31 shown in FIG. 9, the access protection part $36_j$ detects whether the value of the parameter MAS in the JAD file of the application $33_j$ is "1" or not. If the decision is negative, the flow advances to step S36. In step S36, the application $33_j$ is activated, and then the activation processing is terminated.

Figure 10:
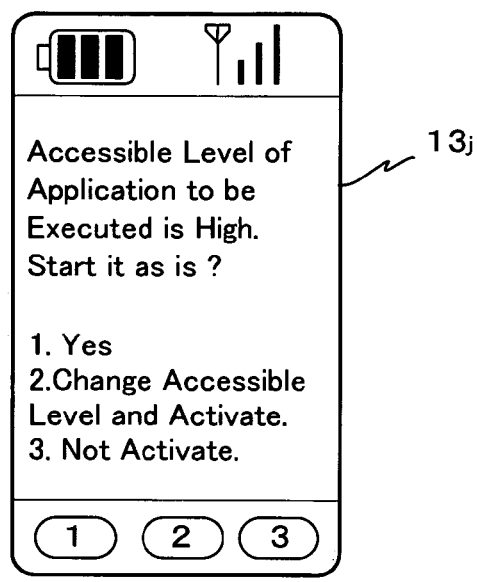
FIG. 10 is a view showing a display example in activation processing.

If the decision in step S31 is affirmative, the flow advances to step S32. In step S32, the screen for accessible level confirmation (to be also referred to as a "accessible level confirmation screen" hereinafter), wherein the screen is formed by referring the accessible level set as the attribute for the application $33_j$ is displayed by the access protection part $36_j$. The example of the accessible level confirmation screen is shown in FIG. 10. In accordance with the guidance in the accessible level confirmation screen, the user performs the designated input for permitting the download or not, and for changing the accessible level or not at the time of activation. Note that in FIG. 10, an example where it is set "high" as the accessible level. When "low" is set as the accessible level, the accessible level confirmation screen in which "high" in FIG. 10 is replaced with "low" is displayed.

Referring back to FIG. 9, the access protection part $36_j$ decides in step S33 whether the termination of the activation is designated or not, after confirming whether the activation by the user is instructed or not, and the change of the accessible level is instructed or not. If the decision is affirmative, the processing is terminated without activating the application $33j$.

If the decision in step S33 is negative, the flow advances to step S34. In step S34, it is decided by the access protection part $36_j$ whether the accessible level change is designated or not. If the decision is negative, the flow advances to step S36. In step S36, the application $33_j$ is activated, and then, the activation processing of the application $33_j$ is terminated.

If the decision in step S34 is affirmative, the flow advances to step S35. In step S35, the accessible level as the attribute of the application $33j$ is changed by the access protection part $36_j$. For example, the accessible level set to "high" is changed to "low". The accessible level set to "low" is changed to "high".

Next, in step S36, the application $33_j$ is activated, and then the activation processing is terminated.

Thus, the execution of the application $33_j$ is started, and then the application $33_j$ accesses to the mail processing related information resource in response to the instruction from the user through the operation unit $12j$.

Among the access operations to the mail processing related information resource, an information acquisition operation from the mail processing related information resource is firstly explained. The mail processing related information resource is stored in the memory unit $23_j$. Note that the mail processing related information resource is set to the high-level protection resource, as described above.

Figure 11:
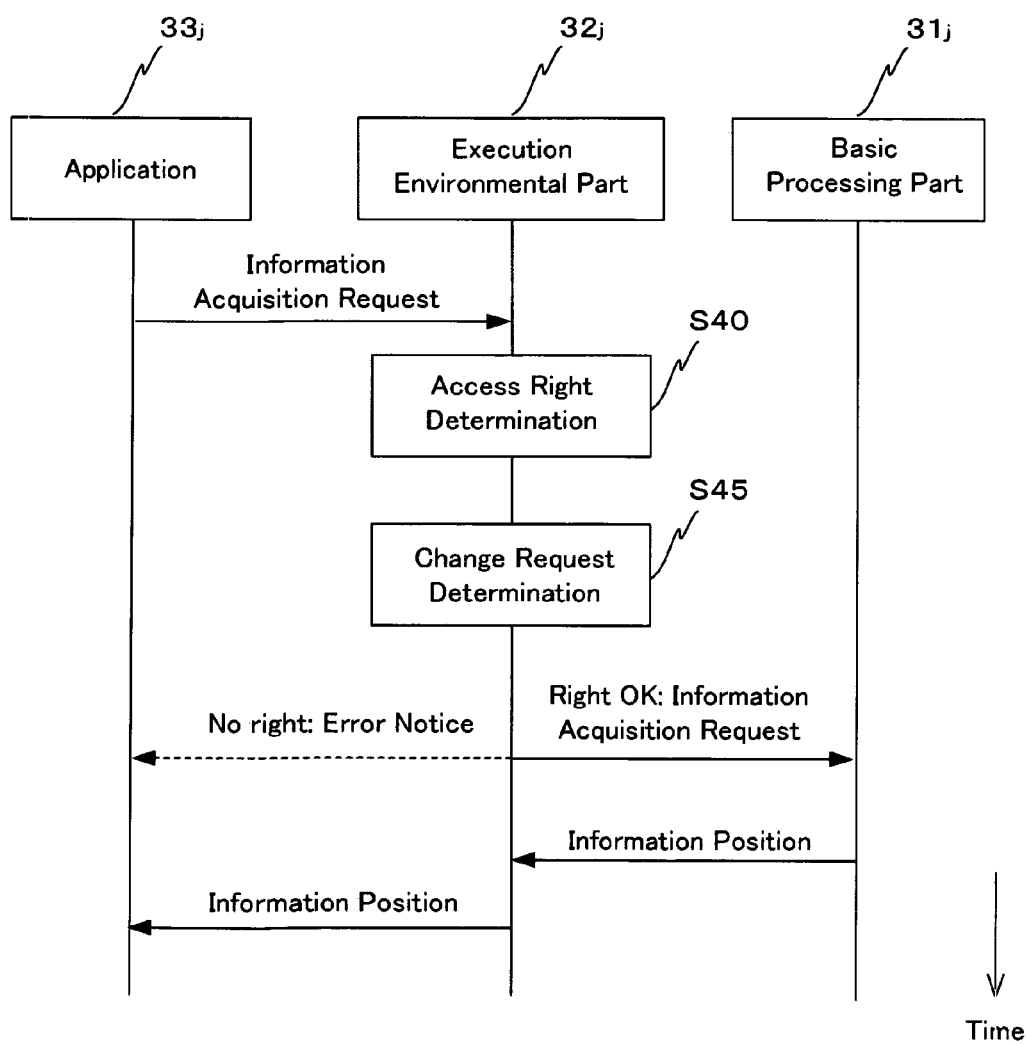
FIG. 11 is a sequence chart for explaining the cooperative operation between the application and the basic processing part in mail related information acquisition processing.

The information acquisition operation from the mail processing related information resource is executed in accordance with the sequence shown in FIG. 11. Note that FIG. 11 is the sequence chart showing a time series with the time plotted along the ordinate.

In the mail processing related information acquisition processing, the information acquisition instruction from the user is sent to the application $33_j$ through the operation unit $12_j$; then, the application $33_j$ notifies the execution environment part $32_j$ of the information acquisition request as the access request, as shown in FIG. 11. The execution environment part $32_j$ received the information acquisition request executes the access right decision processing in step S40 to decide whether the application $33_j$ has the right to access the mail processing related information resource as the access protection target.

Figure 12:
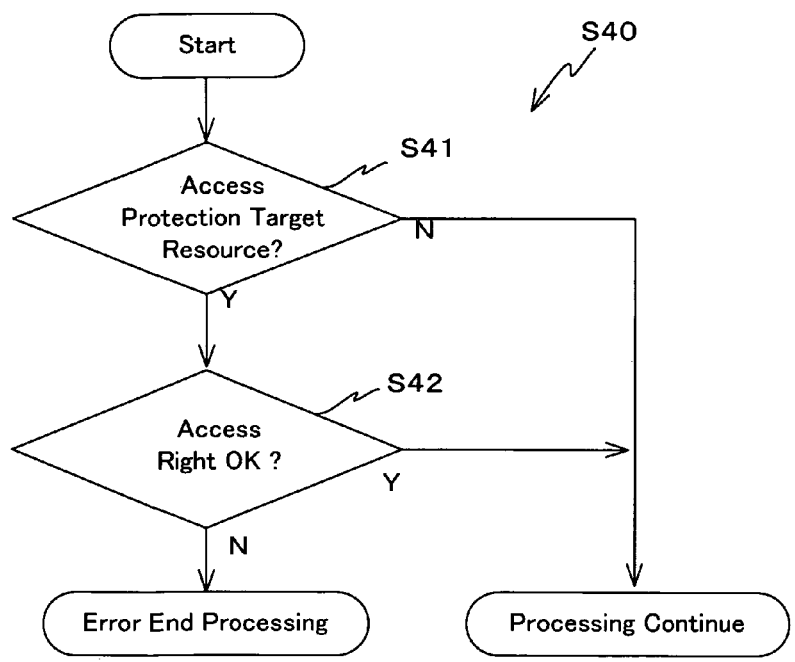
FIG. 12 is a flowchart for explaining access right decision processing in FIG. 11.

In the access right decision processing, as shown in FIG. 12, the access right decision part $37_j$ decides in step S41 whether the resource as the target of the information acquisition request is the resource as the access protection target. If the decision in the step is negative, that is, if the resource as the information acquisition request target is not the access protection target, the execution environment part $32_j$ notifies the basic processing part $31_j$ of the information acquisition request. This is because any kind of applications have the access right for accessing the resource, when the resource as the information acquisition request target is not the access protection target.

On the other hand, since the mail processing related information resource is the resource as the access protection target, as described above, the decision in the step S41 is affirmative 41. If the decision in step S41 is affirmative, the flow advances to step S42.

In step S42, the access right decision part $37_j$ decides whether the application $33_j$ has the access right to the mail processing related information resource as the access protection target. That is, in step S42, it is decided whether the accessible level of the application $33_j$ is "high", when the resource as the access request target is the resource should be protected in the access at high level; alternatively, it is decided whether the value of the parameter MAS in the JAD file of the application $33_j$ is "1" (that is, whether the application $33_j$ is expected to access the resources managed by the basic processing part $31_j$) or not, when the resource as the access request target is the resource should be protected in the access at low level. If the decision is negative, it is decided to notify the application $33_j$ that a violation error of access protection occurred to terminate the access right decision processing. Depending on the decision, the execution environment part $32_j$ notifies the application $33_j$ of the occurrence of the violation error of the access protection (FIG. 11).

On the other hand, as described above, the mail processing related information resource is the resource should be protected in the access at high level, and the accessible level of the application $33_j$ is set to "high". Therefore, the decision in step S42 is affirmative. Thus, the affirmative decision in step S42 leads the decision for continuing the access request processing for the mail processing related information resource to terminate the access right decision processing.

Thus, depending on the decision for continuing the access request processing, the change request decision part $38_j$ decides in step S45 in FIG. 11 whether the access request accompanies the change of the access target resource or not. Herein, the access request is the information acquisition request and does not accompany any changes in the resource contents. Therefore, the execution environment part $32_j$ immediately notifies the basic processing part $31_j$ of the information acquisition request.

The basic processing part $31_j$ receives the information acquisition request notifies the execution environment part $32_j$ of the location of the requested information (the address of the information or the path to the file in which the information is stored). The execution environment part $32_j$ receives the notification notifies the application $33_j$ of the location of the information requested. Then, the application $33_j$ notifies the user of the acquired information, for example, by displaying it on the display unit $13_j$.

Figure 13:
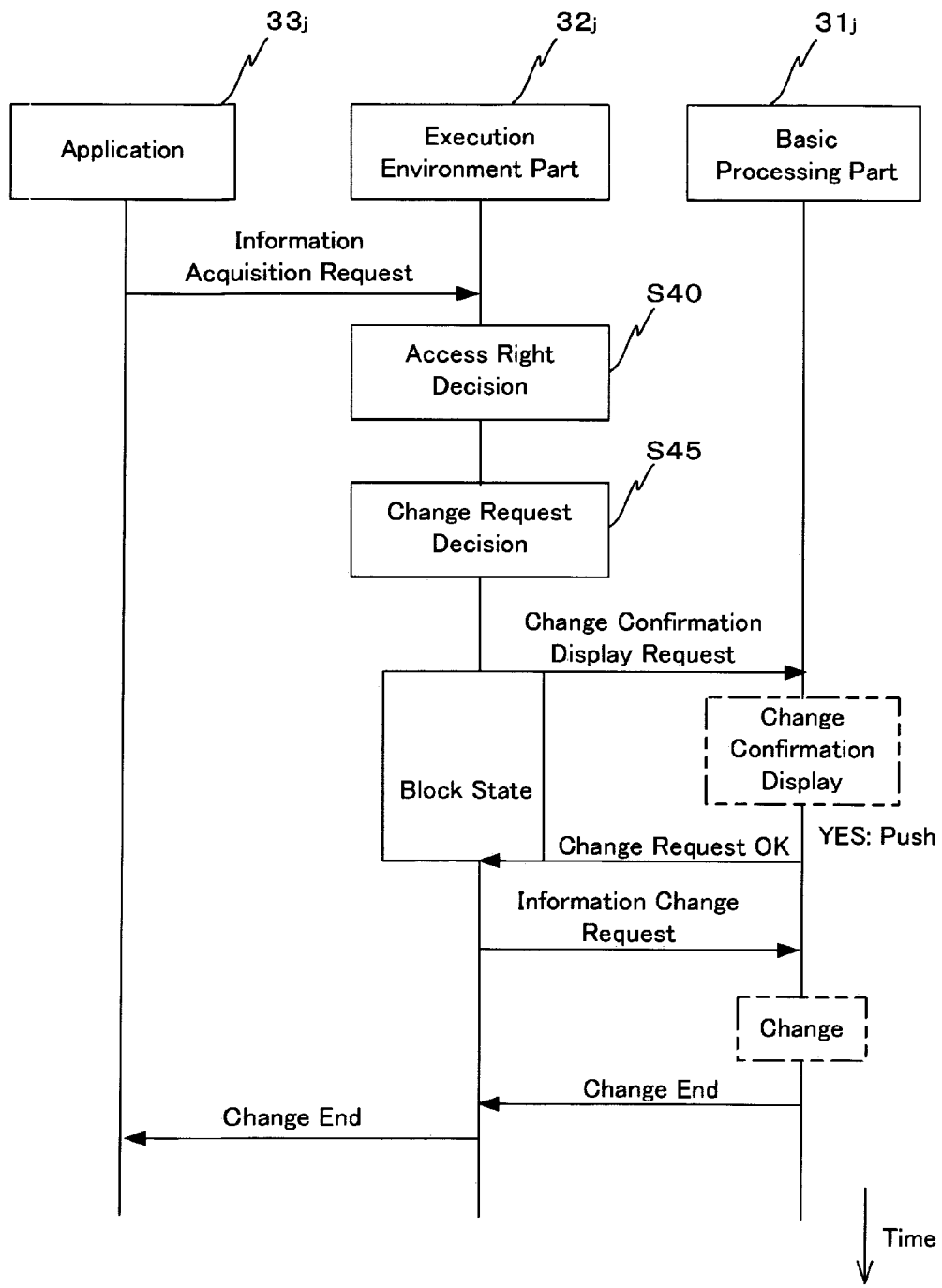
FIG. 13 is a sequence chart for explaining the cooperative operation between the application and the basic processing part in the mail related information change processing.

Next, among the access operations to the mail processing related information resource, changes to them such as addition, deletion or the like is executed in accordance with the sequence shown in FIG. 13. FIG. 13 is the sequence chart showing the time series with the time plotted along the ordinate, similarly to FIG. 11.

In the mail processing related information change processing, depending on the mail processing related information change instruction from the user to the application $33_j$ through the operation unit $12_j$, the application $33_j$ notifies the execution environment part $32_j$ of the mail processing related information change request, as shown in FIG. 13. The execution environment part $32_j$ receives the information change request executes the access right decision processing in step S40 to decide whether the application $33_j$ has the right to access the mail processing related information resource as the access request target, similarly to the case of being received the information acquisition request.

In the access right decision processing, it is decided that the application has the access right to decide to continue the access request processing, similarly to the case of being received the information acquisition request. Subsequently, in step S45, the change request decision part $38_j$ decided whether the access request accompanies the change of the access target resource or not. Herein, in this case, the access request is the information change request, that is, it accompanies the change of resource contents. Therefore, the execution environment part $32_j$ sends to the basic processing part $31_j$ the requests for displaying the change confirmation screen, as well as it is set in the blocked state to refuse any requests from the application $33_j$.

Figure 14:
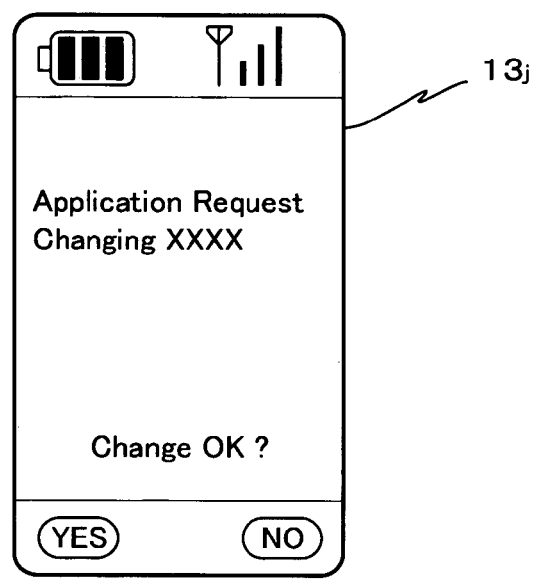
FIG. 14 is a view showing a display example of a change confirmation screen.

The basic processing part $31_j$ receives the change confirmation screen display request displays the change confirmation screen on the display unit $13_j$. The display example of the change confirmation screen is shown in FIG. 14. In accordance with guidance in the change confirmation screen, the user inputs to designate whether the user changes the mail processing related information (for example, the contents of the address book, and so forth). Note that the word "YES" is input, when the change is permitted in the example shown in FIG. 14, and that "NO" is input, when the change is prohibited. Then, the basic processing part $31_j$ notifies the execution environment part $32_j$ of the input result.

The execution environment part $32_j$ receives the notification release the above-mentioned blocked state. When the word "NO" is input in the example shown in FIG. 14, that is, the change is prohibited, the execution environment part $32_j$ notifies the application of it.

When the word "YES" is input in the example shown in FIG. 14, that is, the change is permitted, referring back to FIG. 13; then, the execution environment part $32_j$ requests the basic processing part $31_j$ to change the mail processing related information. The basic processing part $31_j$ receives the change request and performs the change requested. The basic processing part $31_j$ notifies the execution environment part $32_j$ that the change is completed. The execution environment part $32_j$ receives the change completion notification and notifies the application $33_j$ of it.

For changing the mail processing related information performed as described above, it is described in detail by exemplifying the case wherein mails not necessary stored in the mail box is deleted mail.

In order to delete the mail in the mail box according to instructions from the user, the application $33_j$ issues a deletion request to the execution environment part $32_j$, wherein the deletion request having an identification number assigned to each mail message by the basic processing part $31_j$ as an input parameter. The execution environment part $32_j$ receives the deletion request performs both of the access right decision processing (step S40) and the change request decision processing (S45) in response to the deletion request. Then, the execution environment part $32_j$ issues a deletion confirmation screen display request to the basic processing part $31_j$. At this time, the execution environment part $32_j$ turns into the blocked state to refuse any requests from the application $33_j$.

The basic processing part $31_j$ receives the deletion confirmation screen display request displays the deletion confirmation screen, in which "the change of XXXX" in FIG. 14 is replaced with "the deletion of the mail in the mail box". When the user designates "YES", the basic processing part $31_j$ notifies the execution environment part $32_j$ of the deletion permission (the notice means that the "YES" is designated). The execution environment part $32_j$ receives the notice release the blocked state.

The execution environment part $32_j$ receives the deletion permission notice issues a deletion request to the basic processing part $31_j$, wherein the deletion request has the identification number as the input parameter. The basic processing part $31_j$ receives the deletion request confirms whether the mail designated by the identification number is present or not. When the mail is present, the basic processing part $31_j$ delete the mail. Then, the basic processing part $31_j$ notifies the application $33_j$ of the completion of the mail deletion through the execution environment part $32_j$.

Note that the basic processing part $31_j$ notifies the application $33_j$ of the information that the deletion is rejected through the execution environment part $32_j$, when "NO" is designated on the delete confirmation screen. Herein, the execution environment part $32_j$ releases the blocked state on the moment for receiving the deletion reject notice from the basic processing part $31_j$.

Alternatively, the basic processing part $31_j$ notifies the application $33_j$ of the information that there is no mail having the designated identification number in the mail box, when the identification number designated in the identification number confirmation is not present, through the execution environment part $32_j$.

<Mail Transceiving>

Next, mail transceiving processing in the communication system 100 is explained. Furthermore, the following explanation is performed by mainly aiming at the mail transmission from the application $33_1$ of the cellular phone $10_1$ to the application $33_2$ of the cellular phone $10_2$.

Assume that the mail transmission resource and the mail reception resource, both of which are utilized in the mail transceiving processing are the resources, are protected at low level against the access request from the application $33_1$, in this embodiment. The assumption made by the reason why the mail transmission resource and the mail reception resource are different from the above-mentioned mail processing related information resource in that they are not directly related to the personal information, however, it is considered that their use requires communication charges and the like.

Alternatively, that the access to the mail transmission resource or the mail reception resource does not directly change the contents of the resources, however, the use of these resources require the communication charges as described above. Accordingly, assume that these resources are protected from the request similarly to that of the above-mentioned mail processing related information resource, in this embodiment. That is, in this embodiment, the application $33_1$ requires explicit permission of the user to access the mail transmission resource or the mail reception resource.

Figure 15:
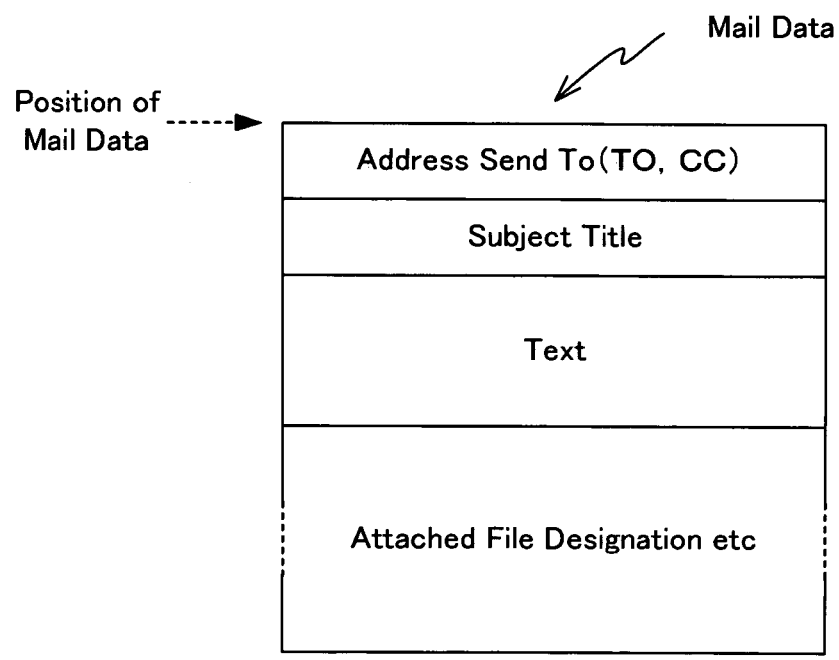
FIG. 15 is a view for explaining the structure of mail data.

Prior to the mail transmission processing, the mail data comprising a destination address, a subject title, a mail text, and an attached file designation, as shown in FIG. 15, is created in the cellular phone $10_1$. The destination address in the mail data is set through the instruction from the user by using the operation unit $12_1$, while the address book information acquisition among the mail related information acquisition operations is appropriately performed. Alternatively, the subject title, the text, and the like are set through the instruction from the user by using the operation unit $12_1$. In order to create these mail data, the application $33_1$ creates the text and the attached file by appropriately incorporating unique data (that is, the data of pictograms, secret characters, or the like) in an original format, wherein the application is capable of decoding them by itself (that is, the application $33_2$ is capable of decoding them).

Figure 16:
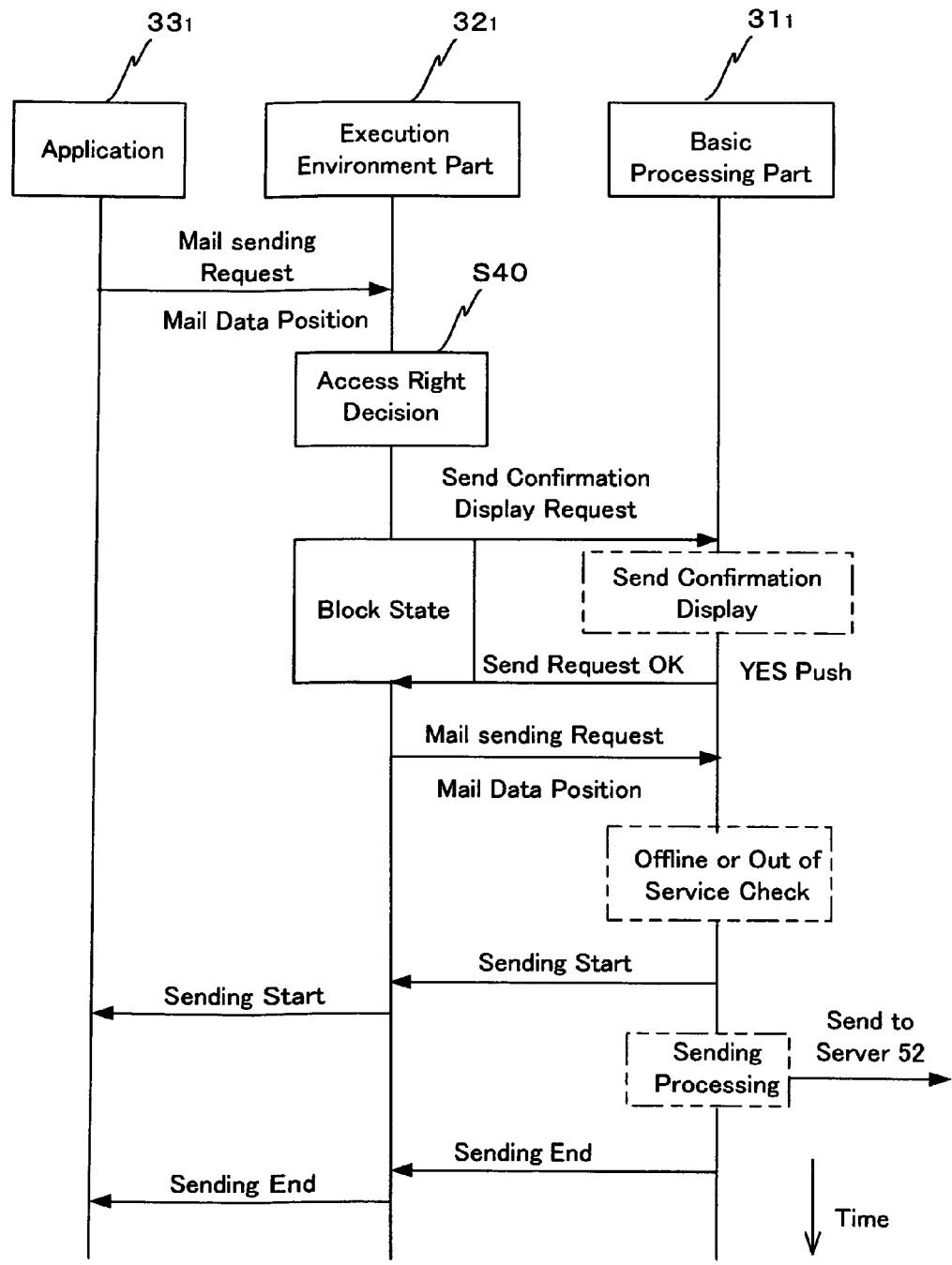
FIG. 16 is a sequence chart for explaining mail transmission processing in the cellular phone according to the embodiment of the present invention.

After the mail data to be transmitted is created, the mail is transmitted in accordance with the sequence shown in FIG. 16, depending on the mail transmission instruction from the user. Note that FIG. 16 is the sequence chart showing the time series with the time plotted along the ordinate, similar to FIGS. 11 and 13.

In this mail transmission processing, at first, the application $33_1$ notifies the execution environment part $32_1$ of the mail transmission request designating the location of the created mail data (the address of the mail data or the path to the file that stores the mail data). The execution environment part $32_1$ receives the mail transmission request performs the access right decision processing in step S40 to decide whether the application $33_1$ has the right to access the mail processing related information resource as the access request target, similar to the above case for receiving the access request to the mail processing related information resource.

In the access right decision processing, the continuation of the access request processing is decided, because the mail transmission resource is the low-level protection resource and the accessible level of the application $33_1$ to the resource is set to "high". After the decision is made, the execution environment part $32_1$ requests the basic processing part $31_1$ to display the transmission confirmation screen, and turns into the blocked state to refuse any requests from the application $33_1$.

Figure 17:
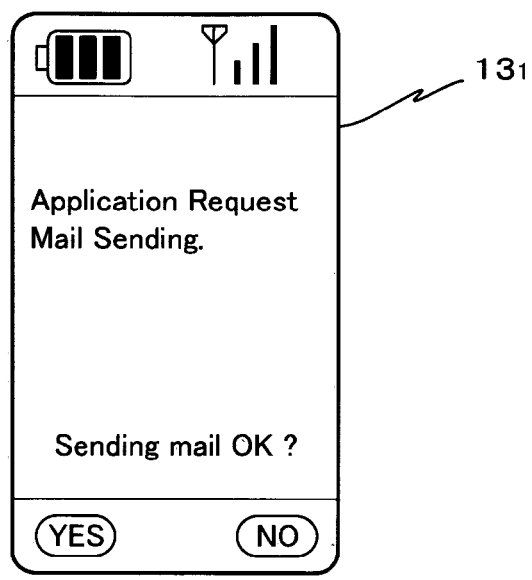
FIG. 17 is a view showing a display example of a transmission confirmation screen.

The basic processing part $31_1$ receives the transmission confirmation screen display request and displays the transmission confirmation screen on a display unit $13_1$. The display example of the transmission confirmation screen is shown in FIG. 17. In accordance with the guidance on the screen, the designation for deciding to transmit the mail or not is instructed by the user. In the example shown in FIG. 17, "YES" is input when the mail transmission is permitted, and "NO" is input when the mail transmission is prohibited. Then, the basic processing part $31_1$ notifies the execution environment part $32_1$ of the input result.

The execution environment part $32_1$ receives the notification and releases the above-mentioned blocked state. Then, in the case that "NO" is input in the example shown in FIG. 17, that is, the mail transmission is cancelled, the execution environment part $32_1$ notifies the application $33_1$ of the cancellation of the transmission.

Referring back to FIG. 16, the execution environment part $32_1$ requests the basic processing part $31_1$ to transmit the mail designating the mail data location, when "YES" is input in the example shown in FIG. 17, that is, the mail transmission is permitted. The basic processing part $31_1$ receives the mail transmission request and reads out the mail data from the designated mail data location to check its formal authenticity such as the data size of the mail data and the possibility for the communication, for example, whether the cellular phone $10_1$ is present within the communication range from the nearest base station $51_1$. Then, the basic processing part $31_1$ starts the mail transmission processing when the mail data is formally authenticated and communication is possible, and notifies the execution environment part $32_1$ that these two requirements are satisfied. The execution environment part $32_1$ receives the mail transmission processing start notification and notifies the application $33_1$ that the processing is started.

The basic processing part $31_1$ which started the mail transmission processing controls the transceiving unit $22_1$ to transmit the mail to the server 52 through both of the base station $51_1$ and network 55. Then, the basic processing part $31_1$ notifies the execution environment part $32_1$ of the event that the mail transmission is completed, when the event is generated, and stores the transmitted mail in the mail box. The execution environment part $32_1$ receives the mail transmission termination notice notifies the application $33_1$ of the reception of it. Note that the basic processing part $31_1$ stops the transmission processing depending on the event generated, wherein errors related to the mail transmission or instructions to stop the mail transmission processing from the user, notifies the execution environment part $32_1$ that mail transmission has failed. Then, the execution environment part $32_1$ receives the notice and notifies the application $33_1$ of it.

The server 52 receives the transmitted mail reads out the transmission destination address (the mail address of the cellular phone $10_2$) from the mail data to specify the nearest base station $51_2$ from the cellular phone $10_2$, as the transmission destination, based on the address readout. Herein, the server 52 executes processing to hold the mail data, when the base station cannot be specified because the cellular phone $10_2$ is in the power-off mode, or the cellular phone $10_2$ is outside the communication range of the communication system 100.

On the other hand, the server 52 transmits the mail to the cellular phone $10_2$ through the base station $51_2$, when the server 52 is capable of specifying the nearest base station $51_2$ from the cellular phone $10_2$. The basic processing part $31_2$ in the cellular phone $10_2$ receives the mail and stores it in the mail box, as well as notifies the execution environment part $32_2$ of the mail reception. The execution environment part $32_2$ notifies the application $33_2$ of the mail reception, when the application $33_2$ is executed. Then, the application $33_2$ notifies the user of the mail reception notice by displaying it on the display unit $13_2$.

On the other hand, the execution environment part $32_2$ notifies the different application from the application $33_2$ of the mail reception, when the different application is executed. Then, the application $33_2$ notifies the user of the mail reception by displaying it on the display unit $13_2$. Alternatively, the execution environment part $32_2$ notifies the basic processing part $31_2$ of the notice for no application being executed, when no application is executed. Then, the basic processing part $31_2$ controls the control unit $21_2$ to notify the user of the mail reception notice by displaying it.

As described above, the application notifies the user of the mail reception, and the application $33_2$ is started if necessary, and then, the mail data acquisition instruction is performed by the user through the operation unit $12_2$. The instruction notifies the execution environment part $32_2$ of the instruction by the application $33_2$, wherein the instruction is one of the mail related information and it acquires the mail data in the mail box. After that, the application $33_2$ acquires the mail data through the similar sequence shown in that (FIG. 11) in the above-mentioned case for acquiring mail processing related information.

In other words, the user instructs the application $33_2$ to acquire both of the mail box information and the mail information. The application $33_2$ receives the instruction and issues both of the mail box information and the mail data acquisition request to the execution environment part $32_2$, as well as both of the mail box information and the mail data acquisition request to the execution environment part $32_2$. In response to the information acquisition request, the execution environment part $32_2$ executes the above mentioned access right decision processing to issue the information acquisition request to the basic processing part $31_2$, wherein the information acquisition request is converted into the command format corresponding to that being used in the basic processing part $31_2$.

The basic processing part $31_2$ receives the information acquisition request and returns both of the requested mail box information and mail information either directly to the application $33_2$, or the address information of the memory area for them to the application $33_2$ through the execution environment part $32_2$. Then, the application $33_2$ displays the received mail box information and mail data as the mail box under the display environment provided by the application $33_2$ (when it receives the address information, the mail box information and the mail data read out from the memory based on the address information). In this case, there is mentioned a variety of display environments, for example, characters or animations may be displayed together with the mail box.

Then, the application $33_2$ acquires the mail data to decode it, and the decoded result is displayed on the display unit $13_2$ to transmit the mail contents to the user. Note that the application $33_2$ decodes the unique format data, because it is equal application to the application $33_1$, even when the unique format data for the application $33_1$ of the cellular phone $10_1$ (for example, pictogram data and secret characters) is incorporated in the text or attached file contents of the mail data. Accordingly, the contents as intended by the mail sender, that is, the user of the cellular phone $10_1$, are accurately transmitted to the mail recipient, the user of the cellular phone $10_2$.

Figure 18:
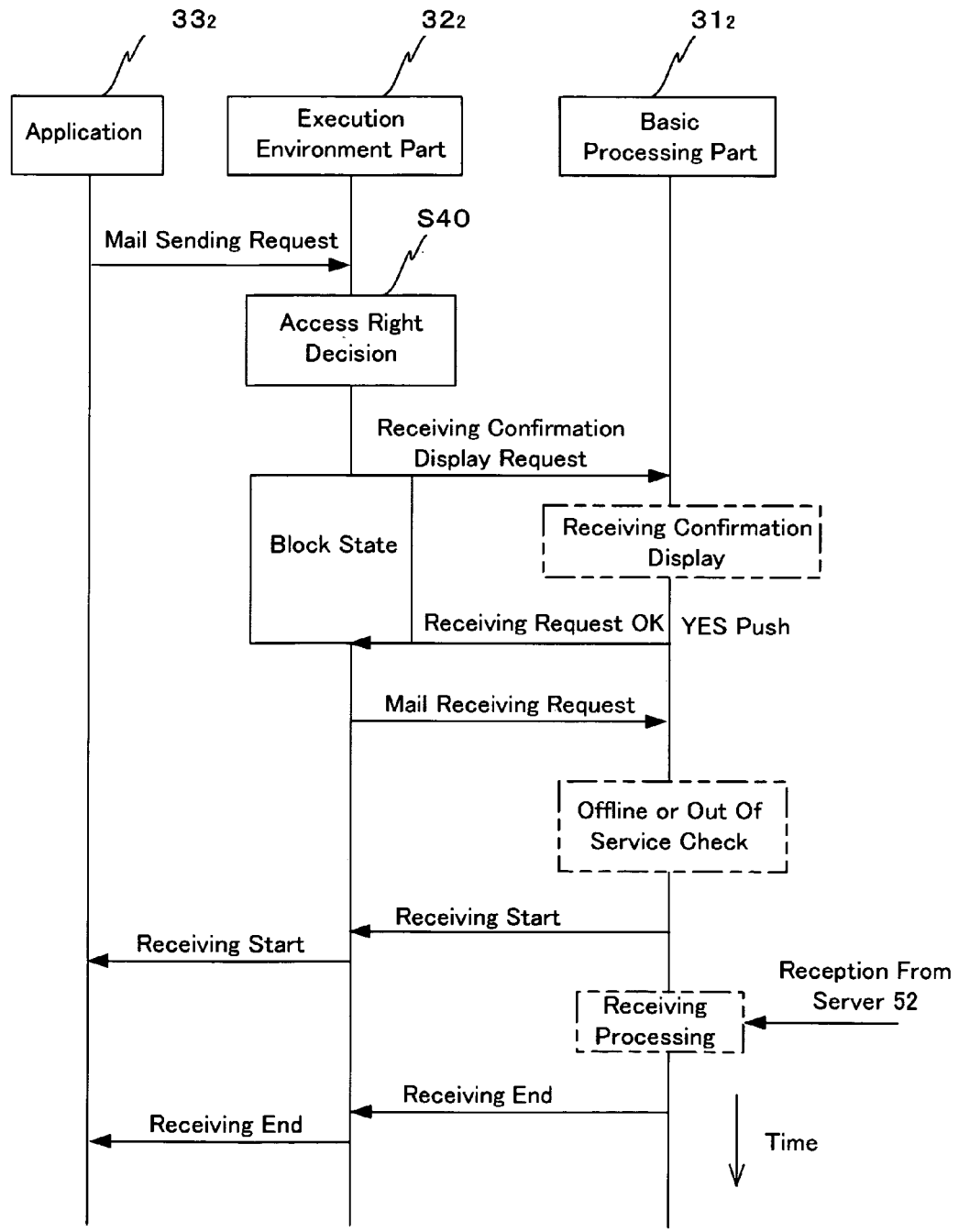
FIG. 18 is a sequence chart for explaining the mail reception processing in the cellular phone according to the embodiment of the present invention.

Alternatively, the mail reception is performed in accordance with the sequence shown in FIG. 18, when the cellular phone $10_2$ is not capable of receiving the mail caused by several reasons, for example, in the power-off mode, so that the mail reception processing by using the application $33_2$ is performed, after power-on of the cellular phone $10_2$. Note that FIG. 18 is the sequence chart (the time series chart) with the time plotted along the ordinate, similar to FIG. 16.

In the mail reception processing, the application $33_2$ notifies the execution environment part $32_2$ of the mail reception request. The execution environment part $32_2$ receives the mail reception request and executes the access right decision processing in step S40, similarly to the case for receiving the above mentioned mail transmission request; wherein it is decided whether the application $33_2$ has the right to access the mail processing related information resource as the access request target, in the access right decision processing.

In the access right decision processing, it is decided to continue the access request processing, because the mail reception resource is the low-level protection resource, and the accessible level of the application $33_2$ is set to "high". After the decision is made, the execution environment part $32_2$ requests the basic processing part $31_2$ to display the reception confirmation screen and turns into the blocked state to refuse any requests from the application $33_2$.

Figure 19:
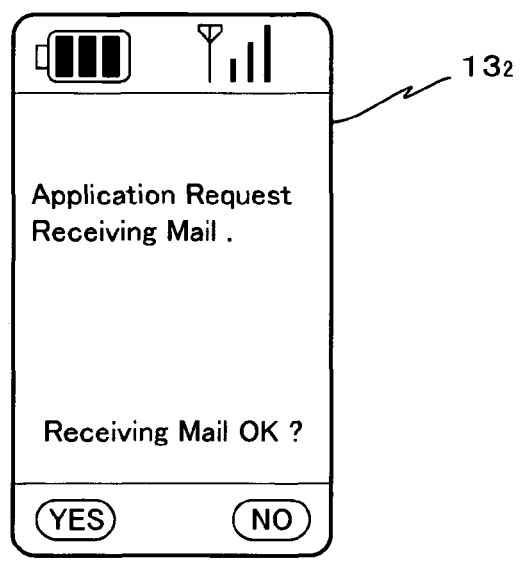
FIG. 19 is a view showing a display example of a reception confirmation screen.

The basic processing part $31_2$ receives the reception confirmation screen display request and displays the reception confirmation screen on the display unit $13_2$. In FIG. 19, the display example of the reception confirmation screen is shown. In accordance with guidance in the reception confirmation screen, the designation input is performed by the user in order to decide whether the mail is received or not by the user. Note that the example in FIG. 19 shows the case, wherein "YES" is input when the mail reception is permitted, and "NO" is input when the mail reception is prohibited. Then, the basic processing part $31_2$ notifies the execution environment part $32_2$ of the input result.

The execution environment part $32_2$ receives the notice releases from the above mentioned blocked state. The execution environment part $32_2$ notifies the application of the cancellation for the mail reception, it means that the "NO" is input in the example shown in FIG. 19.

Referring back to FIG. 18, when "YES" is input in the example shown in FIG. 19, that is, the mail reception is permitted. The basic processing part $31_2$ receives the mail reception request and sends the request to the execution environment part $32_2$. The basic processing part $31_2$ receives the request and checks the possibility of the communication, for example, whether the cellular phone $10_2$ is present in the communication range or not. When it is in the communication range, the basic processing part $31_2$ starts the mail reception processing to notify the execution environment part $32_2$ of the checked result. The execution environment part $32_2$ receives the checked result notifies the application $33_2$ of the result.

The basic processing part $31_2$ starts the mail reception processing controls the transceiving unit $22_2$ to process the reception of the mails from the server 52. Then, after completing the mail reception, the basic processing part $31_2$ stores the information of the received mail in the mail box, which is not shown on the figures, to notice the mail reception of the execution environment part $32_2$ together with the identification number of the received mail. The execution environment part $32_2$ receives both of the reception completion notice and the identification number of the received mail notifies the application $33_2$ of them.

After that, the application $33_2$ acquires the received mail data in the mail box depending on the operation by the user, as the same as the above mentioned case. Then, similarly to the above mentioned case, the application $33_2$ decodes the mail data to display the decoding result on the display unit $13_2$ to transmit the mail contents to the user. Note that the application $33_2$ decodes the unique format data, because it is an equal application to the application $33_1$, also in this case, even when the unique format data for the application $33_1$ of the cellular phone $10_1$ (for example, pictogram data and secret characters) is incorporated in the text or attached file contents of the mail data. Accordingly, the contents as intended by the mail sender, that is, the user of the cellular phone $10_1$, are accurately transmitted to the mail recipient, the user of the cellular phone $10_2$.

Hereinbefore, the mail transmission from the application $33_1$ of the cellular phone $10_1$ to the application $33_2$ of the cellular phone $10_2$ is explained. However, the mail transmission from the application $33_2$ of the cellular phone $10_2$ to the application $33_1$ of the cellular phone $10_1$ is also similarly performed.

Note that, as one example, the contents intended by the mail sender, the user of the cellular phone $10_1$, are not accurately transmitted to the mail recipient, the user of the cellular phone $10_3$, when the mail which should be transmitted from the application $33_1$ of the cellular phone $10_1$ to the application $33_2$ of the cellular phone $10_2$, is accidentally transmitted from the application $33_1$ of the cellular phone $10_1$ to the cellular phone $10_3$, and the contents of the text or attached file of the mail comprises the unique data format to the application $33_1$. In this case, the mail decoding function held by the application $33_1$ of the cellular phone $10_1$ and the application $33_2$ of the cellular phone $10_2$ is different from that held by the application $33_3$ of the cellular phone $10_3$.

As described above, in this embodiment, it is decided whether the application is expected to access a high-level protection resource or low-level protection resource, when the application activation is instructed. If the decision is affirmative, the display for stimulating the user to select whether the permit activation of the application is permitted or not. Then, the application is activated, depending on the instruction of the activation permission from the user. That is, the application is executed in the sole case, when the access by the application being expected to access the resources is permitted by the user, just prior to the execution of the application; wherein the resources are either the high-level protection resource or the low-level protection resource. Accordingly, the basic processing part and application are capable of operating in cooperation with each other, while the access to the high-level protection resource or the low-level protection resource is limited in the reasonable range during the execution of the application.

Alternatively, it is decided whether the application is expected to access the high-level protection resource or the low-level protection resource, when the application is downloaded prior to the installation. If the decision is affirmative, the display to prompt the user to select whether the installation of the application is permitted or not is performed. Then, the application is downloaded to be installed, when the download permission is instructed on the assumption that the application is installed. Accordingly, the application being decided by the user that it might be dangerous is excluded among these being expected to access the predetermined resource, prior to the installation.

Alternatively, the display for stimulating the user to set the access level of the application to the high-level protection resource or the low-level one is performed, when the application being expected to the high level one or the low level one is installed. Then, depending on the instruction for the access level, the access level for the high-level protection resource or the low-level protection resource is set to the instructed access level. As a consequence, both of the high-level protection resource and the low-level protection resource may be protected in reasonable and complex manner, by being referred to every access of the application accesses to them.

In addition, the display for prompting the user to select whether the change request is permitted or not is performed, when the application is executing and the change request is detected; wherein the change request is the request to change the contents of the high-level protection resource or the low-level protection resource. Then, either of the contents of the high-level protection resource or the low-level protection resource is changed, based on the instruction for permitting the change from the user. Therefore, the predetermined resources may be strictly protected in reasonable and complex manner.

Furthermore, in this embodiment, the access request for the mail processing resource is sent from the application to the basic processing part, which manages the mail processing resource, via the execution environment part. The basic processing part receives the access request executes the requested access operation in response to the request. Then, the basic processing part notifies the application of the access execution result through the execution environment part. Consequently, the application being optionally chosen or changed by the user may be capable of accessing to the mail processing resources in cooperation with the basic processing part.

Therefore, the operation environment, display method and the like may remain unchanged by using the same mail processing application, even when the cellular phone is changing to a new model, which accompanies to change the mail operation environment, the display method of the basic processing part or the like. In addition, the user may choose the mail processing application having the operation environment, the display method that suits to the taste of the user, and the like, among a plurality of mail processing applications.

Accordingly, the present embodiment may take a definite form of the mail processing environment that is friendly for the user of a cellular phone.

Furthermore, since the mail processing is executed in cooperation with the application and the basic processing part responding to the mail processing request instruction from the user of the cellular phone, the mail processing environment friendly for the user may be taken as a definite form.

Alternatively, the application 33 may manage all situations of operations related to the access request, because the basic processing part notifies the application of an event, when it detects the event related to an access request (for example, the completion of the mail transmission in response to the mail transmission request) after notifying the result of the access execution to the mail resource in response to the request of the application 33 (for example, the mail transmission start notice in response to the mail transmission request).

Alternatively, in this embodiment, the application $33_1$ (or the application $33_2$) sends the mail transmission request to the basic processing part $31_1$ (or the basic processing part $31_2$) through the execution environment part $32_1$ (or execution environment part $32_2$), wherein the request comprises the mail data created by the application $33_1$ (or application $33_2$). Subsequently, the basic processing part $31_1$ (or basic processing part $31_2$) receives the mail transmission request and transmits the mail to the cellular phone $10_2$ (or cellular phone $10_1$). Thus, the mail transmitted from the cellular phone $10_1$ (or cellular phone $10_2$) is received by the basic processing part $31_2$ (or the basic processing part $31_1$) of the cellular phone $10_2$ (or cellular phone $10_1$).

Then, the application $33_2$ (or application $33_1$) having the equal data decoding function to that of the application $33_1$ (or application $33_2$) sends the mail data acquisition request to the basic processing part $31_2$ (or the basic processing part $31_1$). By this, the basic processing part $31_2$ (or the basic processing part $31_1$) receives the mail data acquisition request and notifies the application $33_2$ (or the application $33_1$) of the mail data. After that, the application $33_2$ (or the application $33_1$) decodes the mail data to notify the user of the cellular phone $10_2$ (or the cellular phone $10_1$) of the mail contents by using the means for displaying the decoding result on the display unit or the like.

As a result, even the mail comprising the data having the original format, neither capable of being created by using the basic processing part $31_1$ (or basic processing part $31_2$) nor decoded by the basic processing part $31_2$ (or basic processing part $31_1$), may effectively transceived between the cellular phone $10_1$ and $10_2$. Furthermore, even when the mail comprising the data having the unique format, which should be sent from the cellular phone $10_1$ (or cellular phone $10_2$) to the cellular phone $10_2$ (or cellular phone $10_1$), is received by another cellular phone $10_3$, the whole contents of the mail is still unknown to the user of the cellular phone $10_3$, unless the cellular phone $10_3$ installs the application equal to the application $33_1$ or application $33_2$.

Accordingly, the present embodiment provides the mail transceiving environment with improved convenience for the users of the cellular phones $10_1$ and $10_2$.

Furthermore, since the basic processing part of the cellular phone notifies the application of the mail reception, when the cellular phone receives the mail is executing not the mailer application but another application, the user can be notified of the mail reception, even during execution of an application.

Alternatively, the application is notified of the start of transmission as the execution result in response to a mail transmission request or the error message related to mail transmission. In addition, the application is notified of the event occurs after the start of transmission such as the transmission completion or the transmission failure as the event. As a result, the application may handle all situations of operations related to the transmission request.

The present invention is not limited to the above-described embodiment, and various changes and modifications can be made.

For example, two accessible levels are available in the above embodiment, however, three or more accessible levels may also be set.

Furthermore, the accessible level is set in accordance with the classification of resources to be accessed in the above embodiment. In contrast, the accessible level may also be set in accordance with the classification of the accessible forms, for example, whether to permit only read access or permit even write access and deletion. Or, the accessible level may be set in accordance with the combination of the classification for resources to be accessed and the classification of the accessible forms. Alternatively, the activation of the application with the lowest accessible level may be prohibited.

In the above embodiment, the level related to the accessible target is solely set for the application as the accessible level. In contrast, the level related to an accessible form may be set for the application in addition to the access target level as the accessible level, for example, whether to permit only read access or permit even write access and deletion in addition to read access.

In the above embodiment, the access right decision part and the change processing decision part are arranged in the execution environment part. However, they may be arranged in the basic processing part.

Alternatively, in the above embodiment, the access protection target is the mail processing resource, however, the access protection according to the present invention can be applied to a desired resource.

Furthermore, the download path of the application in the above embodiment can be any one of a wireless communication path through the transceiving unit 22, a path via an external connection interface, and a path via a storage medium such as a memory card.

Still further, in the above embodiment, to display the mail box or the mail text, the application acquires the mail box information and the mail information from the basic processing part. However, the basic processing part may directly execute the display of the mail box information and the mail information. In this case, the execution environment part needs to be set in the blocked state after the application issues the access request of the information related to the mail until the termination of the display. Therefore, during this time, the application cannot use the execution environment part.

Furthermore, in the above embodiment, a short message whose data amount is equal to or smaller than a predetermined value is received in the mail reception. However, the mail has a data amount more than the predetermined value, the mail data may be received divided in two portions. That is, serial mail reception processing may be executed, in which after the short message arrives, the application receives the sequel of the mail.

Alternatively, in the above embodiment, the present invention is applied to a cellular phone. However, the present invention can also be applied to any mobile communication terminal other than a cellular phone.

INDUSTRIAL APPLICABILITY

As has been described above in detail, the cooperative operation method of the present invention can be applied to the cooperative operation method between the basic processing part and the application in the mobile communication terminal having the basic processing part to manage the predetermined resource.

The cooperative operation method of the present invention can be applied to the mobile communication terminal in which the application and the basic processing part to manage the predetermined resource operate in cooperation with each other.

The access protection program of the present invention can be applied to access protection of the predetermined resource in the cooperative operation between the basic processing part and the application in the mobile communication terminal having the basic processing part to manage the predetermined resource.

The execution environment program of the present invention can be applied to provide the execution environment to the application in the cooperative operation between the basic processing part and the application in a mobile communication terminal having the basic processing part to manage the predetermined resource.

The mailer application program of the present invention can be applied to mail related processing in the mobile communication terminal.

The mail transceiving method and communication system of the present invention can be applied to the mail transceiving method and communication system when one of communication terminals to transmit/receive mail is a mobile communication terminal.

What is claimed is:

1. A control computer comprised in a mobile communication terminal, the control computer programmed with an application access protection program, the mobile communication terminal including an input and a display screen, the application access protection program restricting access by an application to Email confidential information of the mobile communication terminal, the Email confidential information having an access level and being managed by a basic processing part of the mobile communication terminal, wherein the application is outside of the basic processing part and wherein the application access protection program executes the following steps:

inputting the application data to the mobile communication terminal;
deciding from application data whether the application is expected to access the Email confidential information;
if the application is expected to access the Email confidential information, then
(a) displaying a first selection screen to prompt a user to select whether or not to permit downloading of the application;
(b) if the user permits downloading, then downloading the application;
(c) then, if the application is still expected to access the Email confidential information, displaying a second selection screen to prompt the user to select whether or not to permit installation of the application; and
(d) if the user permits installation, then installing the application;
wherein the application data comprises a descriptor file associated with the application at the mobile communication terminal, and
the step of deciding from application data whether the application is expected to access the Email confidential information comprises determining from the descriptor file whether the application is expected to access the Email confidential information.

2. The control computer according to claim 1, wherein the step of deciding from application data whether the application is expected to access the Email confidential information further comprises referring to a value of an access expectation parameter, which is described at a predetermined location of the application and which represents access expectation of the application to the Email confidential information.

3. The control computer according to claim 1, wherein the control computer further executes steps of:
displaying a third selection screen to prompt the user to set an accessible level of the application to the Email confidential information; and
setting an instructed accessible level as the accessible level of the application to the Email confidential information.

4. The control computer according to claim 1, wherein the control computer further executes steps of:
displaying a fourth selection screen to prompt the user to select whether to permit a change request of the contents of the Email confidential information by the application before access to the Email confidential information, when it is decided that the access request from the application comprises the change request of contents for the Email confidential information.

5. The control computer according to claim 1, wherein the Email confidential information comprises at least a part of Email processing resources.

6. A plurality of the control computer according to claim 1, further comprising at least one program executing a method for transceiving Emails between a first mobile communication terminal and a second mobile communication terminal according to claim 1;
the method comprising steps of:
transmitting a mail transmission request, wherein the basic processing part of the first mobile communication terminal requests transmitting an Email, of which content is an Email data created by the application of the first mobile communication terminal, to the basic processing part of the first mobile communication terminal;
transmitting an Email, wherein the basic processing part of the first mobile communication terminal transmits the Email to the second mobile communication terminal, depending on the reception of the mail transmission request;

receiving the Email, wherein the basic processing part of the second mobile communication terminal receives the Email;

acquiring the Email data, wherein the application of the second mobile communication terminal transmits the request to acquire the Email data of the mail; and notifying of the Email data, wherein the basic processing part of the second mobile communication terminal that received the Email data acquisition request notifies the second the Email data of the Email data.

7. A communication system comprising:

a plurality of the mobile communication terminal according to claim 1, further comprising a first communication terminal, and a second communication terminal capable of transceiving Email with the first communication terminal, wherein the basic processing part of the first communication terminal comprises a first basic processing part to manage a first Email processing resource and a first application, wherein the first basic processing part accesses the first Email processing resource in response to an access request to the first Email processing resource from the first application; and the second communication terminal comprises the second basic processing part to manage the second Email processing resource and the second application equal to the first application, and the second basic processing part accesses to the second Email processing resources, depending on the access request to the second Email processing resource from the second application.

8. A non-transitory computer-readable medium containing the application access protection program of claim 1.

* * * * *